(12) United States Patent
Martin et al.

(10) Patent No.: US 11,564,410 B2
(45) Date of Patent: Jan. 31, 2023

(54) APPARATUS FOR ROLLING OR WRAPPING MATERIALS WITHIN AN ELONGATED WRAPPER, AND ASSOCIATED ACCESSORIES

(71) Applicant: Rowller LLC, Katy, TX (US)

(72) Inventors: Francois Charles Martin, Cypress, TX (US); Nemesio Zapata, Katy, TX (US)

( * ) Notice: Subject to any disclaimer, the term of this patent is extended or adjusted under 35 U.S.C. 154(b) by 0 days.

(21) Appl. No.: 17/213,190

(22) Filed: Mar. 25, 2021

(65) Prior Publication Data
US 2022/0304367 A1    Sep. 29, 2022

(51) Int. Cl.
| | | |
|---|---|---|
| *A24C 5/44* | (2006.01) | |
| *A24F 17/00* | (2006.01) | |
| *A23P 20/20* | (2016.01) | |
| *A24B 7/06* | (2006.01) | |
| *A24F 15/18* | (2006.01) | |
| *A24C 5/52* | (2006.01) | |
| *A24C 5/39* | (2006.01) | |

(52) U.S. Cl.
CPC .............. *A24C 5/44* (2013.01); *A23P 20/20* (2016.08); *A24B 7/06* (2013.01); *A24C 5/399* (2013.01); *A24C 5/52* (2013.01); *A24F 15/18* (2013.01); *A24F 17/00* (2013.01)

(58) Field of Classification Search
CPC ... A24C 5/40; A24C 5/44; A24F 15/18; A24F 17/00
See application file for complete search history.

(56) References Cited

U.S. PATENT DOCUMENTS

| | | | | |
|---|---|---|---|---|
| 266,439 | A * | 10/1882 | Daniels, Jr. ............... | A24C 5/44 131/58 |
| 496,467 | A * | 5/1893 | Evers ...................... | A47C 3/021 297/290 |
| 706,931 | A * | 8/1902 | Hammond ............... | A24C 5/44 131/58 |
| 1,266,725 | A * | 5/1918 | Skeels ...................... | A24C 5/44 131/47 |
| 2,009,000 | A * | 7/1935 | Zint ......................... | A24C 5/44 131/58 |
| 2,128,248 | A * | 8/1938 | Hey .......................... | A24C 5/44 131/58 |
| 3,949,947 | A * | 4/1976 | Youngquist ............. | A24F 17/00 242/138 |
| 4,534,367 | A * | 8/1985 | Newsome ................ | A24C 5/40 131/73 |

(Continued)

*Primary Examiner* — Cynthia Szewczyk
(74) *Attorney, Agent, or Firm* — Karen B. Tripp

(57) ABSTRACT

Apparatus for rolling pieces of a wrappable and smokable or edible material, such as tobacco, herbs, or *cannabis*, or foodstuffs, within a wrapper such as a sheet of a paper or seaweed, respectively for smoking or eating. The apparatus comprises a tube (which can comprise integrated outer and inner tubes for ease of manufacture) with a rotatable base, an openable or removable top cap, and a hollow tubular interior. The tube has a longitudinal side opening for receiving the wrapper into said interior of the tube. In operation, the base is rotated and the wrapper is inserted and directed toward said interior where the wrapper wraps around said interior. The wrappable material is thereafter inserted into said tubular interior. Turning the base of the tube causes the wrapper to wrap said material within it. When complete, the wrapped material is removed from the top or bottom of the tube.

19 Claims, 25 Drawing Sheets

(56) References Cited

U.S. PATENT DOCUMENTS

| | | | |
|---|---|---|---|
| 2010/0136494 A1* | 6/2010 | Connolly | F23Q 2/32 |
| | | | 431/253 |
| 2012/0193388 A1* | 8/2012 | Machota | A24F 17/00 |
| | | | 225/39 |
| 2014/0182604 A1* | 7/2014 | Hutton | A24C 5/42 |
| | | | 131/70 |
| 2016/0081390 A1* | 3/2016 | Ackerman | A24C 5/40 |
| | | | 206/86 |
| 2017/0022023 A1* | 1/2017 | Littlejohns | B26F 3/02 |
| 2017/0127717 A1* | 5/2017 | Maher | A24D 1/022 |
| 2020/0329756 A1* | 10/2020 | Karim | A24C 5/44 |

* cited by examiner

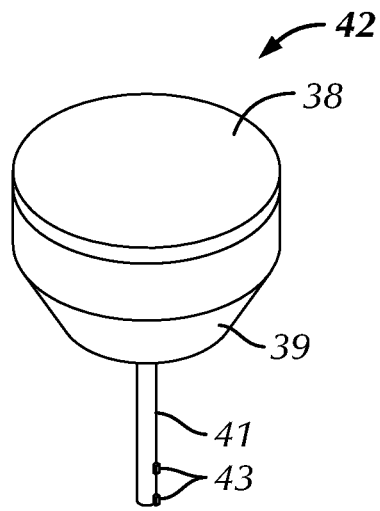
FIG. 32
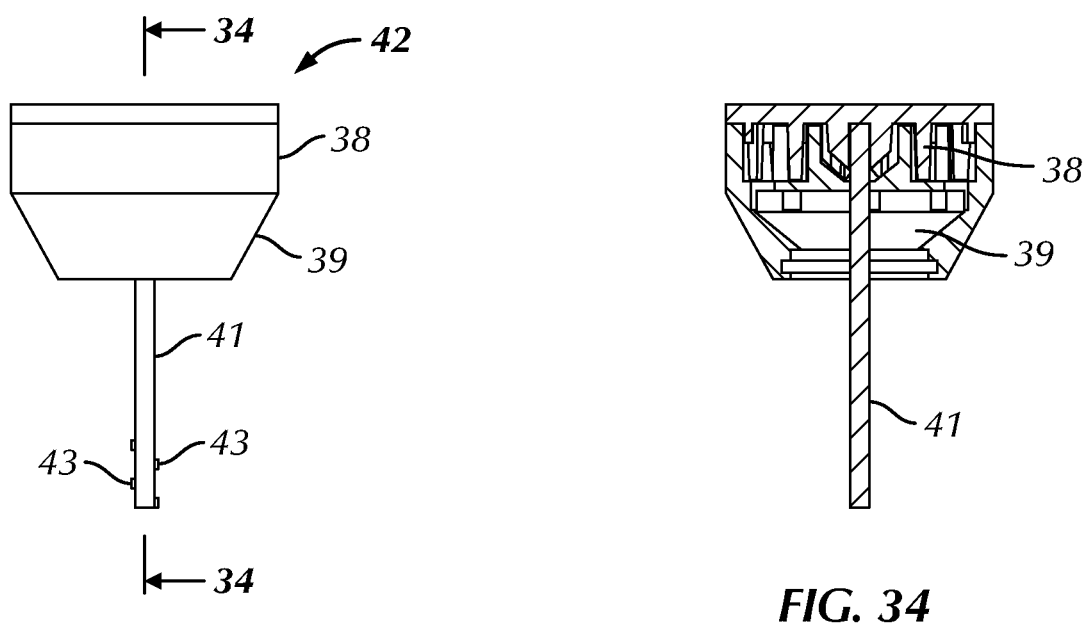
FIG. 33
FIG. 34

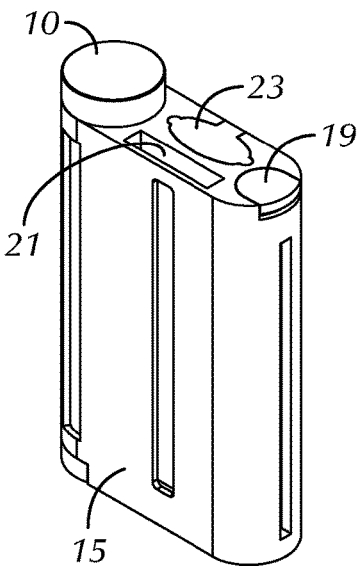
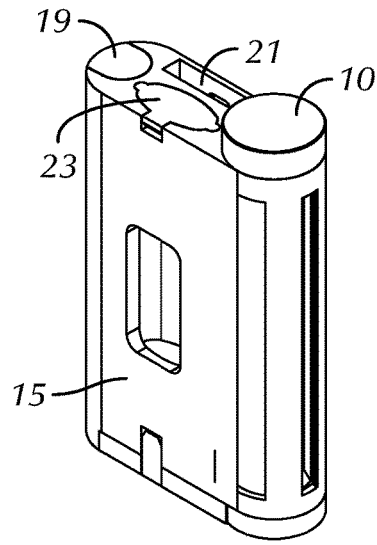
FIG. 42　　　　　FIG. 43
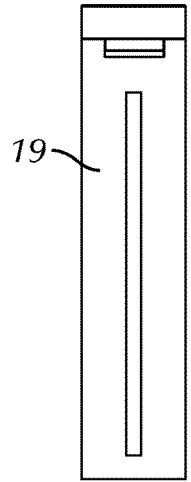
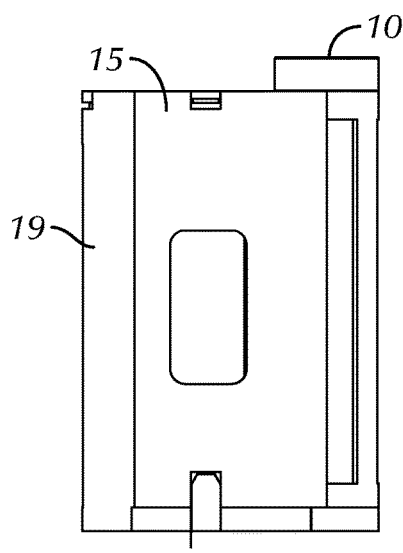
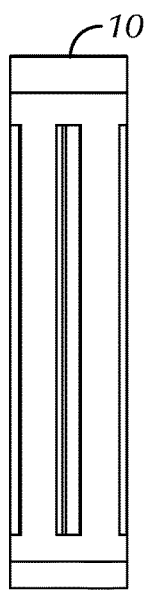
FIG. 45　　　FIG. 46　　　FIG. 47
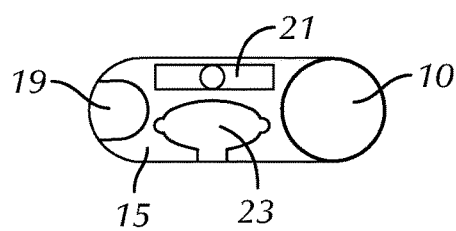
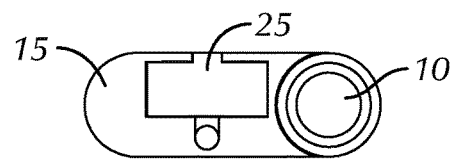
FIG. 44　　　　　FIG. 48

APPARATUS FOR ROLLING OR WRAPPING MATERIALS WITHIN AN ELONGATED WRAPPER, AND ASSOCIATED ACCESSORIES

BACKGROUND

1. Field

The present invention relates to machines and apparatuses for rolling or wrapping one material within another and particularly to rolling cigarettes of tobacco, herbs, and *cannabis* for smoking and to preparing food wraps and rolls of foodstuffs such as, for example, sushi rolls, egg rolls, and wrap sandwiches.

2. Description of Relevant Art

Some persons who smoke like to roll their own cigarettes for smoking—sometimes to save money, sometimes for particular ingredients not available to them in commercially prepared cigarettes, and sometimes for the fun of it, or even the challenge of it.

The rolling process, when performed by hand, requires a keen eye, a steady hand, and a high degree of digital dexterity, since the rolling paper is not very large compared to a human hand, and since the pieces of smoking material tend to roll or slide off the small rolling paper, and since the rolling paper itself is very thin and easily ripped or torn.

A critical step of rolling a cigarette by hand is using one's fingers to both form the "V" or "U" shaped pouch for the smoking material, and to roll the longer portion of the rolling paper around itself. During the process of rolling the longer portion of the paper around itself, the person doing the rolling depends on the trapped smoking material to provide the generally cylindrical shape to guide placement of the longer portion of the paper around itself to produce a generally cylindrical cigarette.

Oftentimes, however, the use of smoking material to guide placement of the longer portion of the paper around itself does not aid in producing a cylinder due to either poor distribution of smoking material along the V- or U-shaped pouch, causing the longer portion of the paper to be rolled too tight or too loose around itself, with respect to the majority portion of the smoking material, or due simply to the person's inability to correctly manipulate or spiral the cigarette rolling paper around itself between their fingers. The results of either of these situations can be an unsmokable cigarette, a cigarette that falls apart, or a cigarette that is torn, which also has the effect of making the cigarette unsmokable.

Also, cigarettes that are rolled by hand using conventional cigarette rolling paper typically do not include filters or other means for preventing the smoking material from being drawn into the smoker's mouth. One method that is used to prevent smoking material from being drawn into a smoker's mouth while the smoker is smoking a hand-rolled cigarette (without a filter) has been to restrict the size of the opening by pinching or twisting the end of the rolling paper upon itself. While this method is somewhat effective at reducing passage of smoking material from the cigarette, it also restricts the amount of air that can be drawn through the cigarette, and this restricts consumption of the smoking material. Restricting the cigarette air passage also requires a larger effort by the smoker that reduces smoking pleasure.

Cigarettes that are rolled using conventional cigarette rolling paper also do not permit complete use of the smoking material disposed within because the cigarette can only be smoked until the lit end approaches the smoker's fingers or lips during holding or smoking, at which time the cigarette must be dispensed, or a smoker's fingers or lips may be burned. Filters add length to a cigarette and enable more and even most if not all of the smoking material to be smoked. However, it is difficult to hand-roll a cigarette with a filter inside. Individuals who are handicapped or who suffer from ailments such as arthritis may not be able to perform such a task. In addition, the process of hand-rolling paper for cigarettes with filters is time consuming and likely to result in cigarettes that are untidy and/or asymmetric, which detracts from the smoking experience and/or renders the cigarettes unusable.

Various accessories and devices for rolling cigarettes are known, yet a majority of them are themselves cumbersome to use, are too large to be portable and therefore are impractical, or are intended for industrial production of cigarettes. There is a need in the industry for a rolling apparatus that addresses the limitations of the prior art and permits a smoker to assemble a higher quality rolled cigarette with ease and efficiency.

SUMMARY

The present invention provides an apparatus that overcomes limitations of the prior art for assembling a higher quality rolled cigarette or cigar and can be used for wrapping some other materials as well, such as foodstuffs—sushi rolls, eggrolls, and wrap sandwiches to name a few examples. The apparatus of the invention is thus generally suitable for rolling pieces of a first material (for smoking or eating) within a sheet of a second material (smokable, burnable, edible, or not) with ease and efficiency, manually or with the aid of electronics, or even with full electrical or battery operation.

The apparatus of the invention comprises a cylindrical tube. In one embodiment, the apparatus of the invention has only one cylindrical tube. In an alternative embodiment, the apparatus of the invention comprises an outer cylindrical tube with a longitudinal side opening and an inner cylindrical tube fitted inside that outer cylindrical tube. The embodiment having a single tube has substantially the same features as the embodiment comprising the outer cylindrical tube and the inner cylindrical tube, but with the features simply made into one tube, rather than combining together an outer cylindrical tube and an inner cylindrical tube. The embodiment with an outer cylindrical tube and an inner cylindrical tube is currently believed easier to make, and thus that embodiment is primarily discussed and shown herein, although the disclosure herein applies as well to the embodiment with only one cylindrical tube, being effectively the same as having the inner cylindrical tube and the outer cylindrical tube combined.

The inner cylindrical tube has an opening at the top and a hollow tubular interior for receiving and holding a filler material to be rolled or wrapped (such as tobacco, herbs or *cannabis* for smoking, or foodstuffs for eating, for example). This inner cylindrical tube also has a longitudinal side opening corresponding to the longitudinal side opening of the outer cylindrical tube. The longitudinal side opening of the outer cylindrical tube extends to the longitudinal side opening of the inner cylindrical tube and the longitudinal side opening of the inner cylindrical tube extends from the exterior of the inner cylindrical tube into the center of that tube's hollow tubular interior to provide a side opening into that hollow tubular interior for receiving one side of a rolling or wrapping material (or wrapper). This side opening into the hollow tubular interior is straight, curved, or arced approximating the beginning of a spiral up into the hollow interior, allowing or facilitating a side of the rolling or wrapping material to enter this hollow space and be gripped in or held in the hollow tubular interior, in turn allowing or facilitating this rolling or wrapping material to begin rolling and enclosing the material to be wrapped with a rotation of the rolling material about the interior of the inner cylindrical tube.

In one embodiment, this side opening extending into the hollow tubular interior ends in or with a lip in the hollow tubular interior to help facilitate gripping of the rolling or wrapping material for turning and wrapping the contents of the filler material within the tubular interior of the inner cylindrical tube (which is not hollow when the filler material has been deposited within it, but is referred to herein as the hollow tubular interior for consistency). The lip can extend into the hollow tubular interior for a short distance, as little as 0.25 inch, to effectively push the bottom or lower end of the wrapping sheet toward the filter for wrapping.

In one embodiment, the apparatus of the invention has a funnel removably fitted into or otherwise connected to the proximal end of the outer cylindrical tube so that the funnel neck protrudes into the hollow tubular interior of the inner cylindrical tube so as to be able to direct and/or allow the smooth delivery of the material to be rolled into the hollow tubular interior of the inner cylindrical tube for rolling. The funnel neck, that is, the portion of the funnel that protrudes into the hollow tubular interior of the inner cylindrical tube, can also help guide the rolling or wrapping material or sheet to be rolled, helping said wrapping material or sheet maintain a cylindrical shape during the rolling, in addition to helping prevent filler material (that is, material to be rolled) from slipping behind the wrapping material or sheet when said material is being introduced into the hollow tube interior of the inner cylindrical tube for rolling.

In one embodiment, the apparatus of the invention has a top comprising a removable top cap that covers the funnel. In one embodiment, the cap comprises a stick which extends from the underside of the cap into the hollow tubular interior of the inner cylindrical tube for helping prevent ground filler materials from clogging at the neck of the funnel, and also for pushing, compacting or compressing, and distributing the material to be wrapped after the material is placed or deposited inside the funnel and/or the hollow tubular interior. The length of the stick can be long enough to extend only into a portion of the hollow tubular interior of the inner cylindrical tube or can be long enough to extend the full length or nearly the full length of that hollow tubular interior.

In one or more embodiments, the apparatus of the invention has multiple or a variety of alternative top caps, such as, for non-limiting example, one with no stick, one with a shorter stick, and one with a stick extending nearly the full length of the hollow tubular interior of the inner cylindrical tube. In another embodiment, the apparatus can comprise such a stick separate and apart from the cap. In any embodiment, the stick must have a diameter less than the diameter of the hollow tubular interior of the inner cylindrical tube.

In still another embodiment, the top or proximal end of the apparatus further comprises a removable grinder or two-part or two-section grinder or grinder subassembly, which fits atop the funnel (with the removable top cap removed), where one section, the top section, of the grinder subassembly has an underlying stick that extends downward through the second section, the bottom section, of the grinder subassembly and into the hollow tubular interior of the inner cylindrical tube. In this embodiment, the removable cap is not used at all or at least is not used while the grinder subassembly is on, over or above the funnel. If desired, the grinder subassembly can have a cover.

The apparatus of the invention further comprises a rotatable bottom, base or bottom cap with an elongated or columnar central protrusion that fits into the distal end of the outer cylindrical tube where the protrusion extends upward into the hollow tubular interior of the inner cylindrical tube. The protrusion extending into the hollow tubular interior of the inner cylindrical tube can optionally receive and hold a filter for a wrap product including a filter, such as for example a filtered cigarette. When no filter is installed or used, the protrusion facilitates grabbing of the wrapping material or wrapping sheet (as by friction) for wrapping the filler material within the internal cylindrical tube. When a filter is used, the filter serves this function of facilitating grabbing of the wrapping material or wrapping sheet for wrapping within it the filler material that is in the internal cylindrical tube.

For wrapping the filler material within the wrapping material or wrapping sheet, all within the tubular interior of the inner cylindrical tube (with the wrapping material inserted first and adjacent the surface of the inner cylindrical tube and then the filler material to be wrapped deposited into the tubular interior), the base is rotated or turned at least one full turn. In one embodiment, the inner cylindrical tube is, optionally, at least substantially transparent and the outer cylindrical tube is also optionally transparent or has an optional transparent or cut-out window for viewing the inner cylindrical tube for ease in determining the progress of the wrapping of the filler material with the wrapping material. In an embodiment employing a single cylindrical tube, that tube is preferably at least partially transparent.

In one embodiment of the apparatus of the invention, the base is removable so that the wrapped product, such as a cigarette, once completed, can be removed from this distal end of the apparatus. Alternatively, the funnel and/or grinder or top cap are removed or lifted from the proximal end of the apparatus and the wrapped product, such as a cigarette, is removed from that proximal end of the apparatus.

In one embodiment, this apparatus of the invention has a housing that holds various items that might be associated or helpful with the apparatus, such as multiple wrapping materials, extra filters, lighter, matches, storage for already wrapped cigarettes, a stick to help in compressing the material, and/or extra filler materials to be wrapped. The apparatus can also have accessories for use with it such as a cup for holding a supply of filler materials to be wrapped. Such cup can be adapted to fit onto the proximal end of the apparatus for directly feeding the filler material into a grinder or funnel of the apparatus.

BRIEF DESCRIPTION OF THE DRAWINGS

The present invention will be better understood by referring to the following detailed description of preferred embodiments and the drawings referenced therein, in which:

FIG. 32 is a top side perspective view of the grinder subassembly of FIG. 29.

FIG. 33 is a side view of the grinder subassembly of FIGS. 29 and 30.

FIG. 34 is a side view of the grinder subassembly of FIGS. 29, 32 and 33 with half removed to show the interior.

FIG. 42 is a back side perspective view of still another alternative embodiment of the apparatus of the invention with housing having compartments for auxiliary materials or supplies.

FIG. 43 is a front side perspective view of the apparatus with housing of FIG. 42

FIG. 44 is a top view of the apparatus with housing of FIGS. 42 and 43.

FIG. 45 is an end view of the back of the apparatus with housing of FIG. 42.

FIG. 46 is a side view of the apparatus with housing of FIGS. 42 and 43.

FIG. 47 is the opposing end view of the apparatus with housing of FIGS. 42 and 45.

FIG. 48 is a bottom view of the apparatus with housing of FIGS. 42, 46, and 48.

REFERENCE LIST OF NUMBERS IN THE FIGURES

Figure 1:
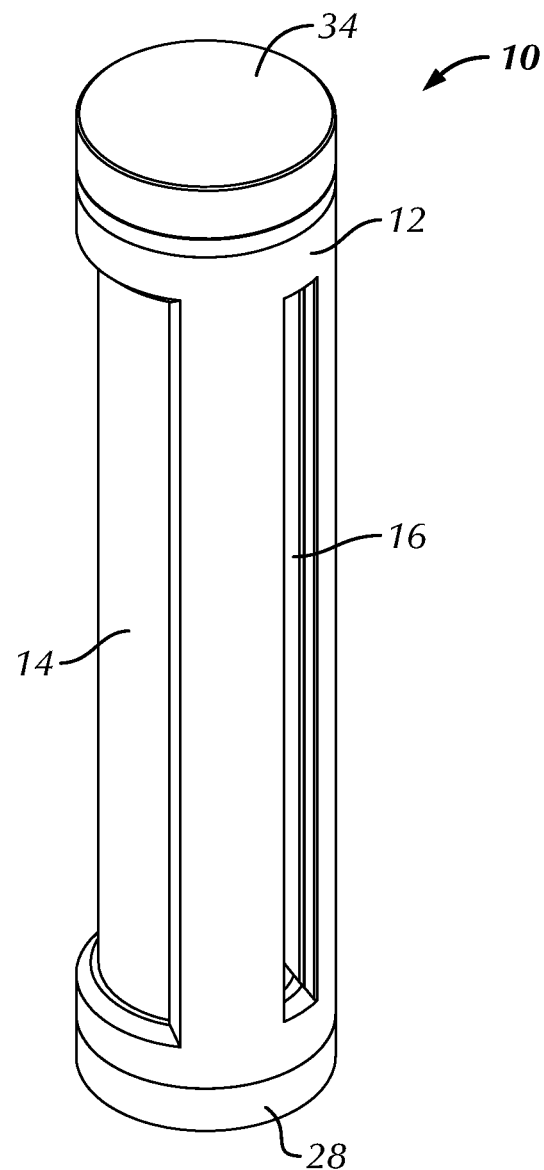
FIG. 1 is a perspective view of one embodiment of the apparatus of the invention.
Figure 2:
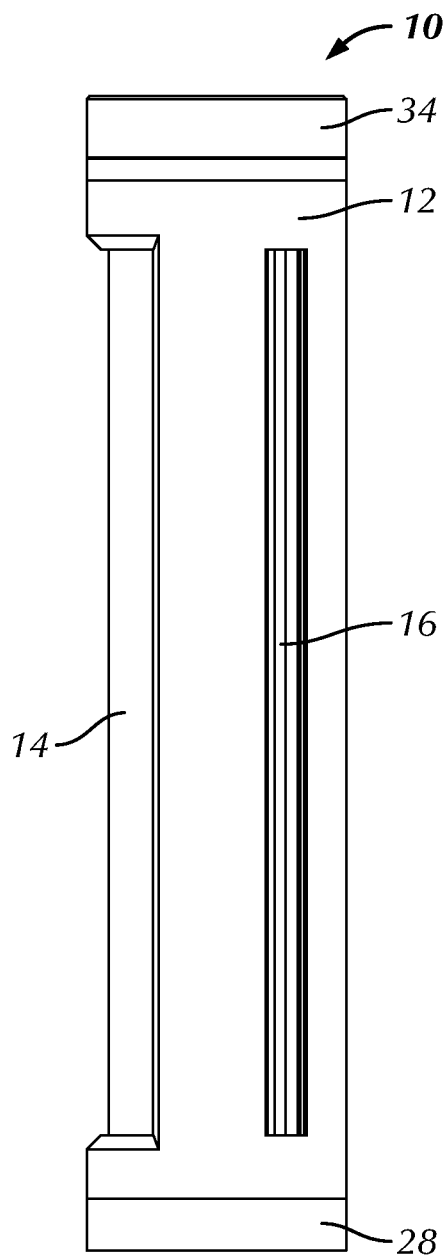
FIG. 2 is side view of the embodiment of the apparatus of the invention of FIG. 1.
Figure 3:
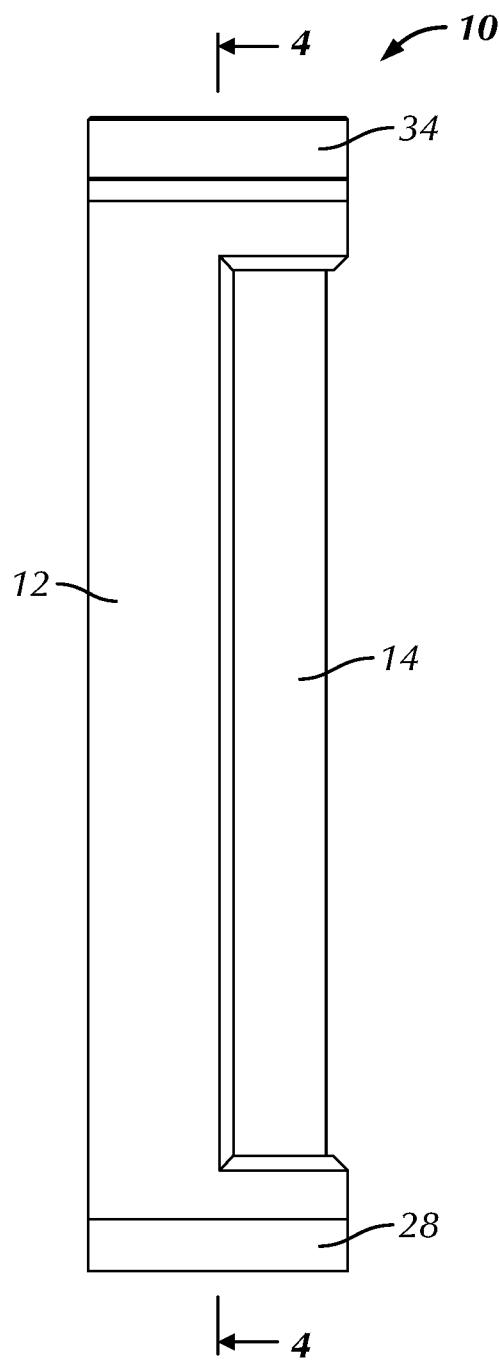
FIG. 3 is another side view of the apparatus of FIGS. 1 and 2, shown from a different side than that shown in FIGS. 1 and 2.
Figure 4:
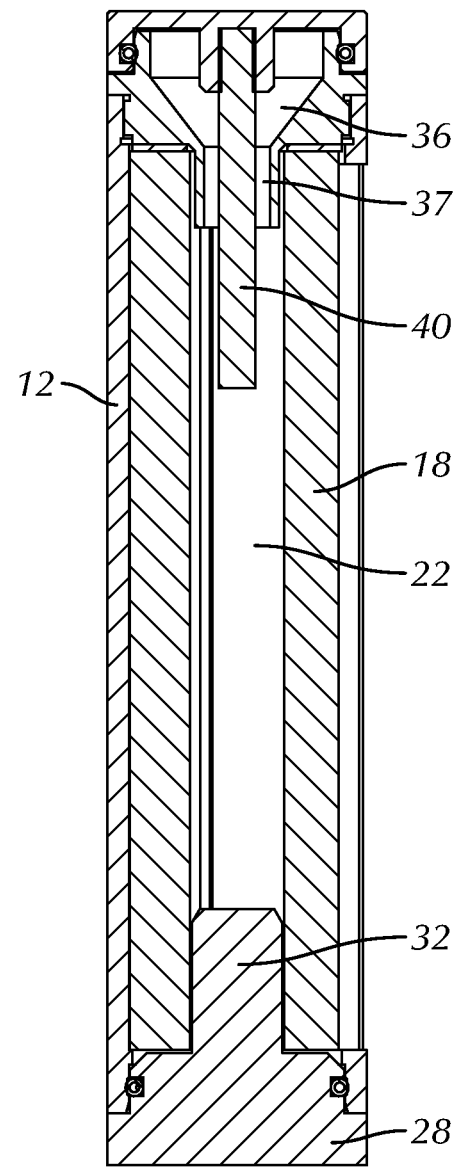
FIG. 4 is side view of the apparatus of FIG. 3 with half sliced away to show the interior.

10 apparatus according to one embodiment of the invention
11 apparatus according to an alternative embodiment of the invention
12 outer cylindrical tube 12 comprising the housing for apparatus 10
13 apparatus according to an alternative embodiment of the invention having a single cylindrical tube
14 window in the outer cylindrical tube 12
15 alternative or auxiliary housing for the apparatus 10 and apparatus 11
16 longitudinal side opening in the outer cylindrical tube 12
17 longitudinal side opening in the single cylindrical tube 27
18 inner cylindrical tube
19 storage chamber
20 longitudinal side opening in inner cylindrical tube 18
21 holder
22 hollow tubular interior
23 pocket
24 longitudinal cut in side of inner cylindrical tube 18 that forms an arc or curve
25 container
26 optionally tip or lip ending the arc or curve 24 in the hollow tube interior 22
27 single cylindrical tube comprising one embodiment of apparatus of invention
28 base
30 alternative base
32 columnar protrusion rising from base 28
33 alternative columnar protrusion arising from alternative base 30
34 top cap
36 funnel
37 neck of funnel 36
38 top section of grinder subassembly
39 bottom section of grinder subassembly
40 stick
41 alternative stick
42 grinder subassembly
43 protrusions or lips on alternative stick 41
50 wrapping material or wrapping sheet for wrapping filler material 54 within it
52 optional filter
54 filler material to be wrapped within wrapping material or wrapping sheet 50
60 storage container or cup
62 body of storage container or cup 60
64 lid of storage container or cup 60 (in two parts)

DETAILED DESCRIPTION OF CERTAIN EMBODIMENTS

The present invention provides a roller for rolling pieces of one material within another material easily and efficiently. The invention is particularly suited for manually rolling cigarettes and cigars (of substantially any smokable size) but can be adapted for automatic rolling, such as for example as with electrical controls powered by a battery or through an electrical outlet. While rolling cigarettes and cigars of tobacco, herbs, and *cannabis* are the subject of one embodiment of the invention, and will be used primarily in the description herein, for example, the principles of the invention can be used for some other purposes as well, that is for the rolling of some other substances and materials such as foodstuffs, for example, sushi rolls, egg rolls, and wrap sandwiches.

Referring to the FIGS. 1-28, one embodiment of the invention, apparatus 10, has a housing comprising an outer cylindrical tube 12 along the sides of which is a window 14 and a longitudinal side opening 16. An inner cylindrical tube 18, also with a longitudinal side opening 20 fits inside the outer cylindrical tube 12 such that the longitudinal side opening 16 in the outer cylindrical tube 12 corresponds to the longitudinal side opening 20 in the inner cylindrical tube 18.

Figure 15:
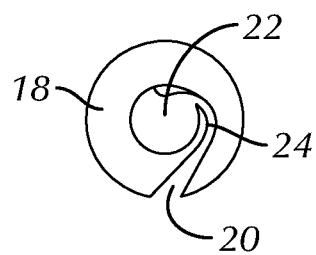
FIG. 15 is a top view of the inner cylindrical tube of FIGS. 1, 13, and 14.
Figure 14:
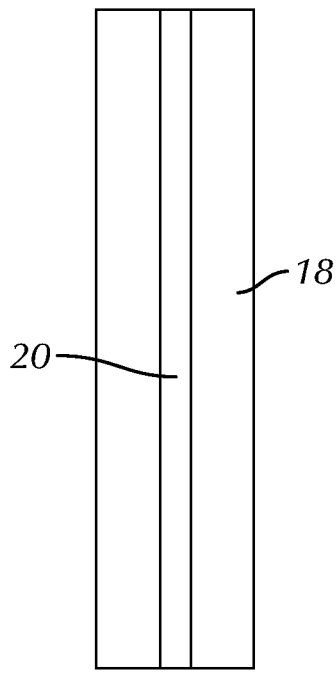
FIG. 14 is a side view of the inner cylindrical tube of FIGS. 1 and 13.
Figure 13:
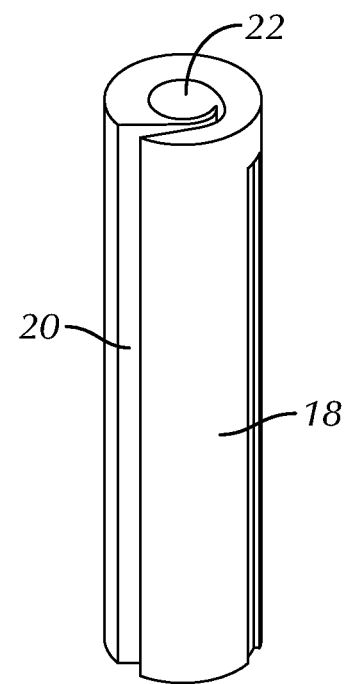
FIG. 13 is a top side perspective view of the inner cylindrical tube of the apparatus of the invention of FIG. 1, with an internal lip.
Figure 16:
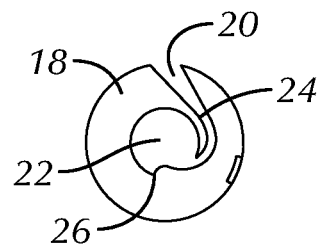
FIG. 16 is a bottom view of the inner cylindrical tube of FIGS. 1, 13, 14, and 15.

As can be seen in FIGS. 5, 13, 15, 16, 17, and 19, the longitudinal opening 20 in inner cylindrical tube 18 is a deep cut through the inner cylindrical tube 18 to the hollow tube interior 22 of the inner cylindrical tube 18, a cut that is straight or that forms an arc or curve 24 as shown in FIGS. 8, 13, 17, and 19 and optionally ends in a tip or lip 26 as shown in FIG. 15. In use of apparatus 10, wrapping material or wrapping sheet 50 is inserted into the longitudinal openings 20 and 16 to wrap around the hollow tube interior 22, as will be discussed further below.

Figure 19:
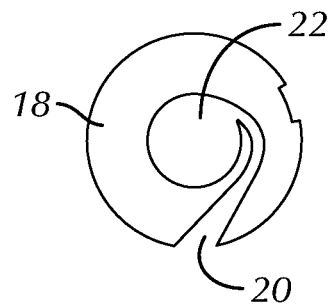
FIG. 19 is a top view or a bottom view of the inner cylindrical tube of FIG. 18, as the top view and the bottom view of the inner cylindrical tube of FIG. 18 are the same.
Figure 17:
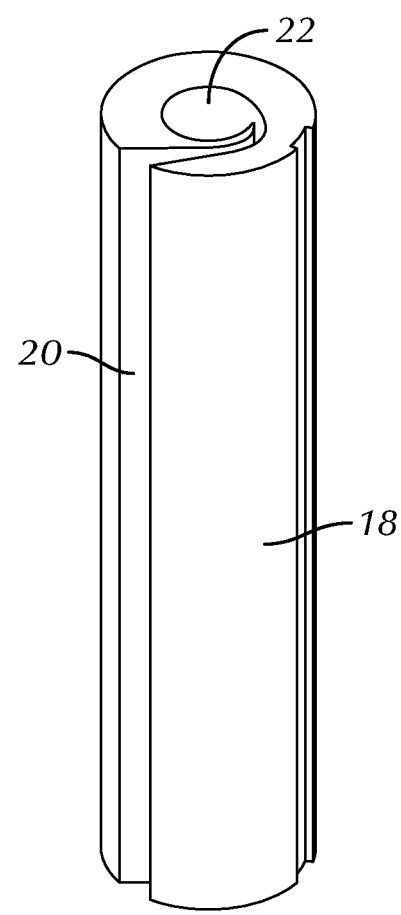
FIG. 17 is a top perspective view of an alternative inner cylindrical tube of a first alternative apparatus of the invention, like the apparatus of the invention of FIG. 1 except that the alternative inner cylindrical tube of this first alternative apparatus of the invention does not have an internal lip.
Figure 18:
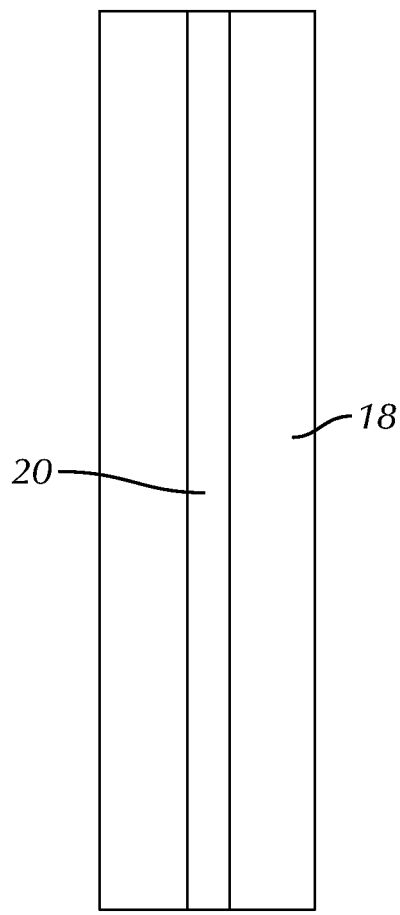
FIG. 18 is a side view of the inner cylindrical tube of FIG. 17.
Figure 20:
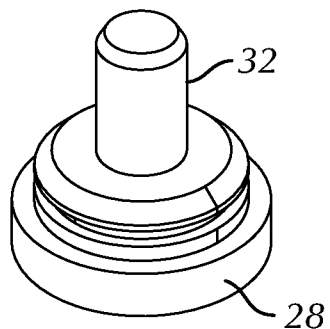
FIG. 20 is a top side perspective view of a base of the apparatus of the invention of FIG. 1, which does not receive a filter.
Figure 25:
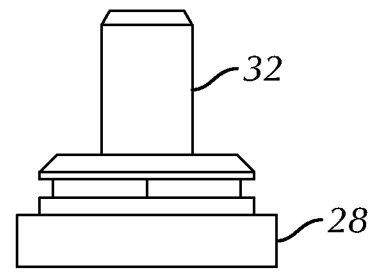
FIG. 25 is a side view of the base of the apparatus of the invention of FIG. 20, which does not receive a filter.
Figure 21A:
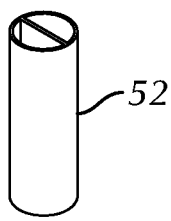
FIG. 21A is a top side perspective view of a filter for use on alternative protrusion 33 of alternative base 30.
Figure 21B:
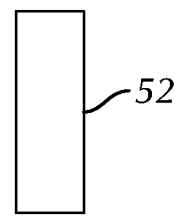
FIG. 21B is a side view of the filter of FIG. 21A.

Outer cylindrical tube 12 and inner cylindrical tube 18 as shown in FIGS. 17, 18, and 19 rest on base or bottom 28. Base 28 turns independent of outer cylindrical tube 12, which itself doesn't turn, and base 28 turns independent of inner cylindrical tube 18, which also doesn't turn, so as to cause movement of the wrapping material or wrapping sheet 50 into and around hollow tube interior 22 for wrapping the filler material 54 to be enclosed or wrapped. Columnar protrusion 32 rising from base 28 into the lower portion of the hollow tube interior 22 provides support for the wrapping material 50 during the rolling or wrapping process with apparatus 10, as shown in FIG. 20. In addition to said support, columnar protrusion 32 contributes to, the gripping of the wrapping material 50. Columnar protrusion 32 effects such gripping through friction. The columnar protrusion 32 can be comprised of rubber or a rubber-like substance or similar material to enhance such friction between the columnar protrusion 32 and the wrapping material 50 and the consequent gripping of the wrapping material 50 to help facilitate the rolling of the wrapping material 50 about the filler material 54 for creation of the product such as a cigarette or cigar.

Figure 22:
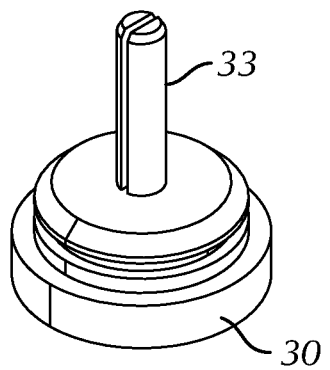
FIG. 22 a top side perspective view of an alternative base of the apparatus of the invention of FIG. 1, which receives a filter.
Figure 23:
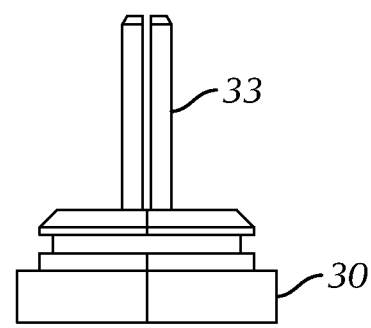
FIG. 23 is a side view of the base of FIG. 22.

Alternatively, when a cigarette is being rolled with apparatus 10 and a filtered cigarette is desired, alternative columnar protrusion 33 is used, as shown in FIG. 22, and outer cylindrical tube 12 and inner cylindrical tube 18 as shown in FIGS. 13, 14, 15, and 16 rest on base or bottom 30. Alternative columnar protrusion 33 rises from alternative base 30 into the lower portion of the hollow tube interior 22 and serves to hold or support optional filter 52, shown in FIGS. 21A and 21B, which can be placed on columnar protrusion 33 for including the filter 52 within the wrap, as shown in FIG. 22. Like base 28, alternative base 30 turns independent of outer cylindrical tube 12, which itself doesn't turn, and turns independent of inner cylindrical tube 18, which also doesn't turn, so as to cause movement of the wrapping material or wrapping sheet 50 into and around hollow tube interior 22 for wrapping the filler material 54 to be enclosed or wrapped.

Lip 26 in the hollow tube interior 22 shown in FIG. 15 and optional filter 52 on alternative columnar protrusion 33 also grip or provide support for the wrapping material 50 during the rolling or wrapping process with apparatus 10. In one embodiment, filter 52 will have on its surface a non-toxic or edible glue, which can be activated for adhesion by moisture. Thus, moistening the filter prior to inserting it on alternative columnar protrusion 33 would enhance the ability of the filter to adhere to the wrapping material 50 further facilitating the wrapping.

In one embodiment, base 28 (or alternative base 30), can have a snap type fit into outer cylindrical tube 12. Such snap type fit can be obtained by use of O-rings or springs, particularly canted springs, for example. That is, an O-ring layer comprising a soft and a rigid O-ring is provided, or a canted coil springs are provided, such that there is compression and then decompression when the pieces to be attached come together, effecting a snug fit or attachment between the two pieces. Other means for attaching base 28 (or alternative base 30) to outer cylindrical tube 12 can alternatively be used, such as for example a screw-type fitting into cylindrical tube 12. Another alternative method for fitting base 28 (or alternative base 30) into outer cylindrical tube 12 is by using O-ring springs, where the O-ring spring is positioned on a groove that is on either the outer cylindrical tube 12 or on base 28 (or alternative base 30), so that when base 28 (or alternative base 30) enters the distal end of outer cylindrical tube 12, the O-ring spring squeezes down and expands meeting another groove in the outer cylindrical tube 12. And another alternative is by using an O-ring instead of an O-ring spring for the connection described. The O-ring can be solid, hollowed or made of two layers that are soft from the inside and hard on the outside to allow the squeeze/expansion mechanism as shown in FIGS. 7A, 7B, 7C, 8A, 8B, 8C, and 9A, 9B, and 9C.

However base 28 (or alternative base 30) is attached to outer cylindrical tube 12, base 28 (or alternative base 30) must have and maintain ability to be rotated so that it can cause the turning and thereby wrapping of wrapping material or wrapping sheet 50 around the filler material 54 to be wrapped, all within the hollow tube interior 22 of the inner cylindrical tube 18. Base 28 or alternative base 30 at the bottom or distal end of apparatus 10 is turned at least one rotation to wrap and enclose the filler material 54 within the wrapping material or wrapping sheet 50.

Filler material 54 to be wrapped is placed through funnel 36 (FIGS. 5, 6, 25-28) into the hollow tube interior 22 of inner cylindrical tube 18 after the wrapping material or wrapping sheet 50 has been inserted into the hollow tube interior 22, and after top cap 34 has been removed or lifted from the top or proximal end of the apparatus 10. Funnel 36 is positioned below top cap 34 and at the top or proximal end of apparatus 10, to help facilitate entry of the filler material 54 into the hollow tube interior 22. The funnel neck 37 of funnel 36 protrudes into the hollow tubular interior 22 of the inner cylindrical tube 18 so as to be able to direct and/or allow the smooth delivery of the filler material 54 to be rolled into the hollow tubular interior 22 of the inner cylindrical tube 18 for rolling. The funnel neck 37 can also help guide the wrapping material or sheet 50 to be rolled, helping said wrapping material or sheet 50 maintain a desired cylindrical shape during the rolling, in addition to helping prevent filler material 54 from slipping behind the wrapping material or sheet 50 when material 54 is being introduced into the hollow tube interior 22 of the inner cylindrical tube 18 for rolling. When funnel 36 is not used, the filler material 54 is deposited directly into the hollow tubular interior 22 after top cap 34 is removed or lifted.

Figure 5:
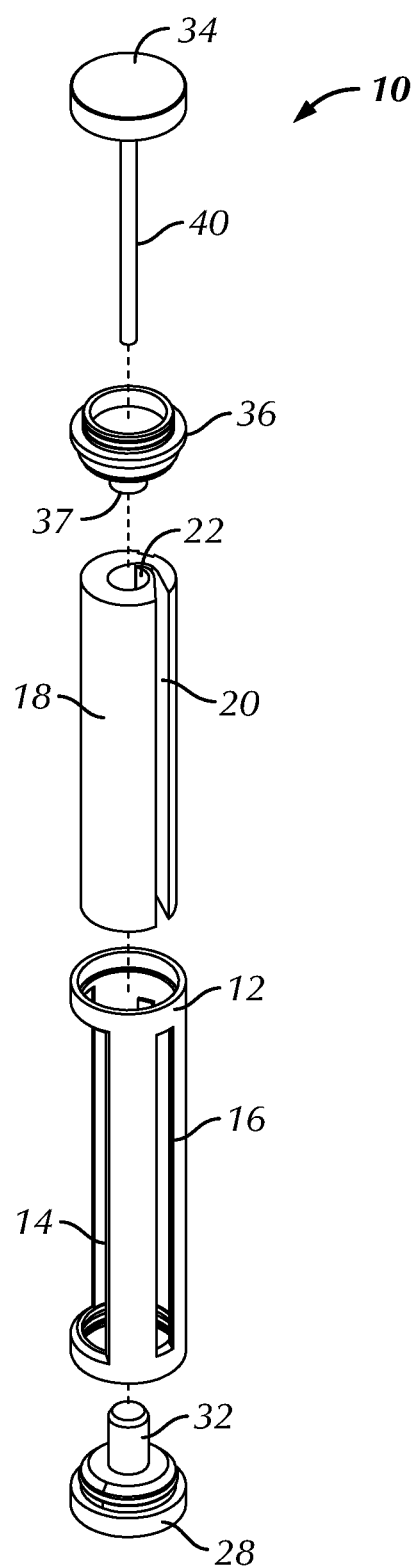
FIG. 5 is an exploded perspective view of the embodiment of the apparatus of the invention of FIG. 1.
Figure 6:
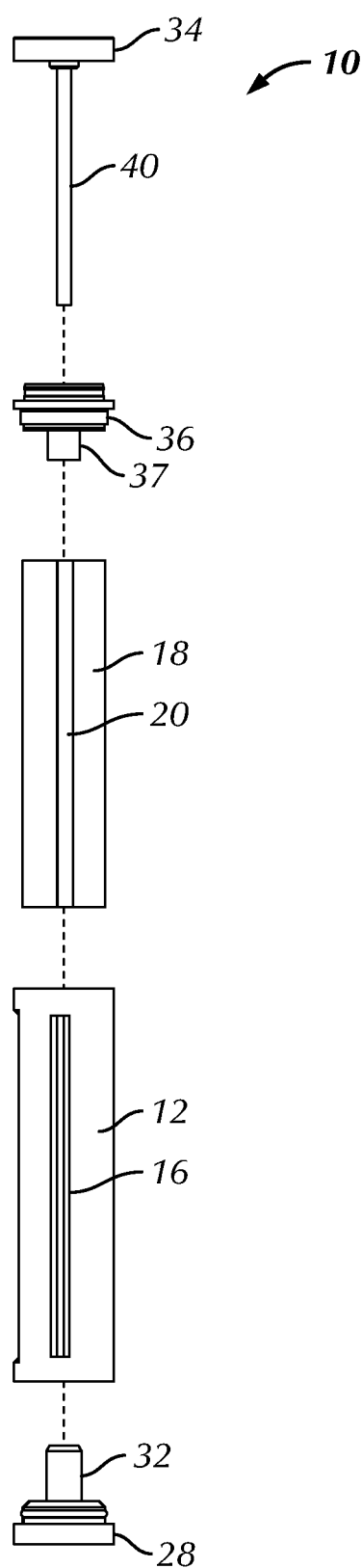
FIG. 6 is an exploded side view of the embodiment of the apparatus of the invention of FIG. 1.
Figure 7A:
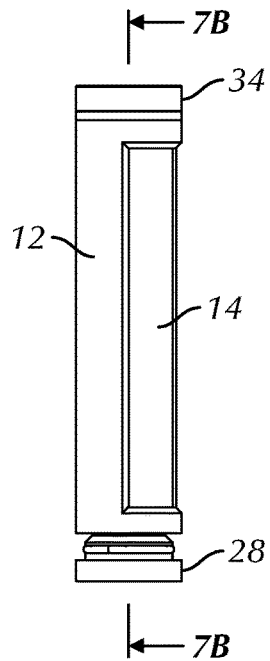
FIGS. 7A, 8A, and 9A show the insertion and connection of the bottom cap or base into the apparatus of FIG. 1.
Figure 7B:
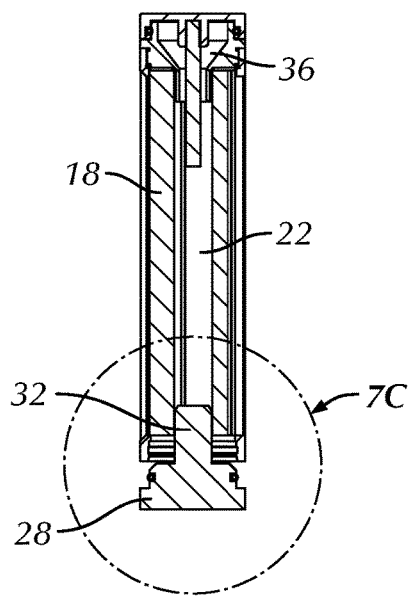
FIGS. 7B, 8B, and 9B show the interior of the apparatus as shown respectively in FIGS. 7A, 8A, and 9A.
Figure 7C:
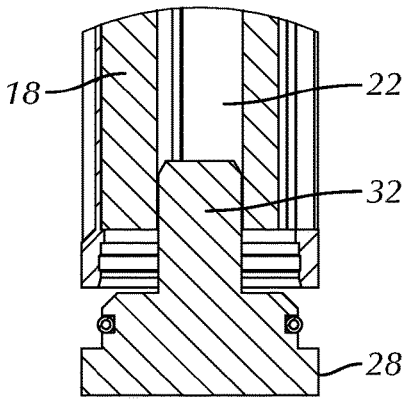
FIGS. 7C, 8C, and 9C show an enlargement of the interior of the apparatus as shown respectively in FIGS. 7A, 8A, 9A, and 7B, 8B, and 9B for further detail of the insertion and connection of the bottom cap or base into the apparatus of FIG. 1.
Figure 8A:
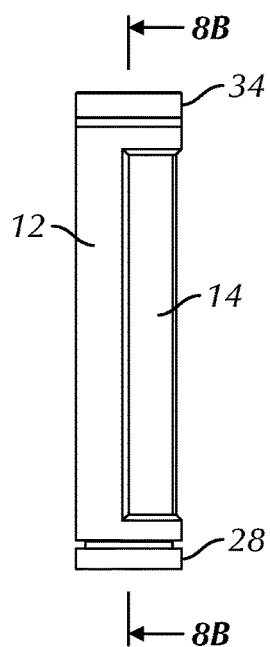
Figure 8B:
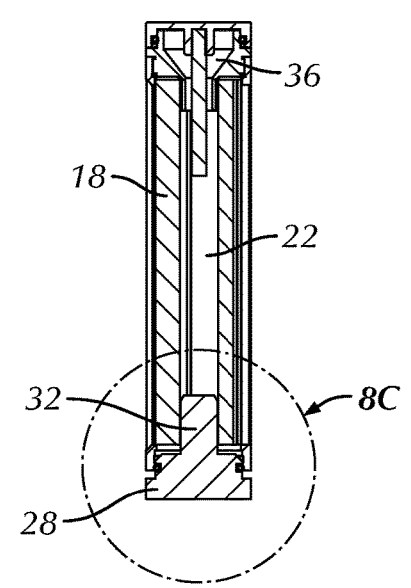
Figure 8C:
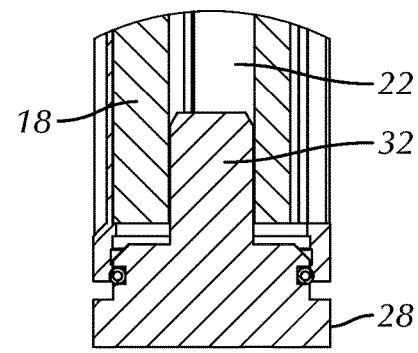
Figure 9A:
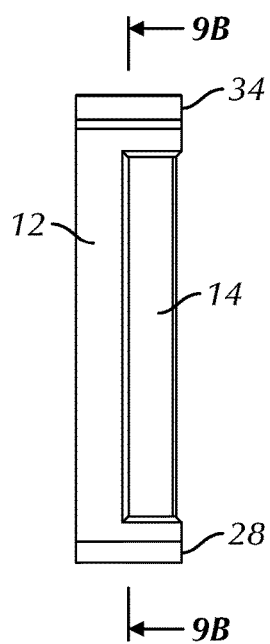
Figure 9B:
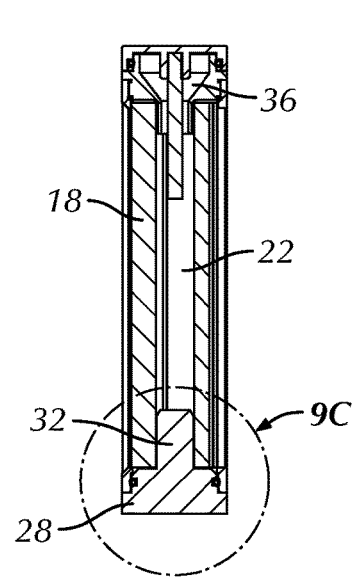
Figure 9C:
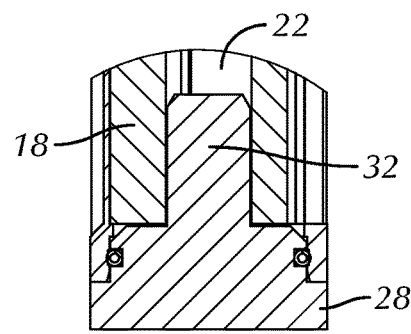
Figure 12:
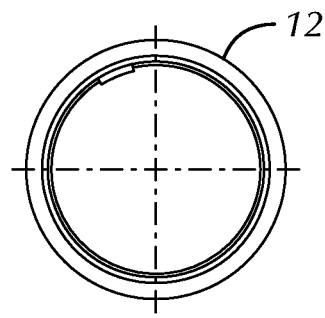
FIG. 12 is a top view of the outer cylindrical tube of the embodiment of the apparatus of FIGS. 1, 10, and 11.
Figure 10:
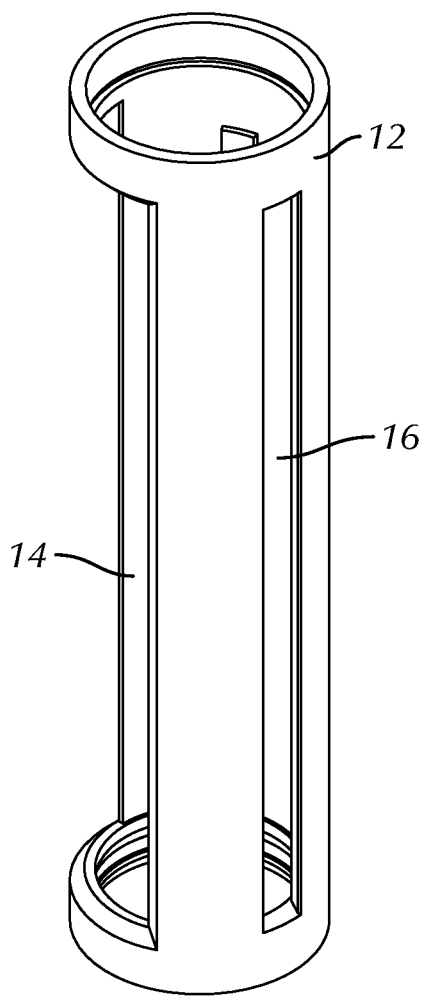
FIG. 10 is a side perspective view of the outer cylindrical tube of the embodiment of the apparatus of FIG. 1.
Figure 11:
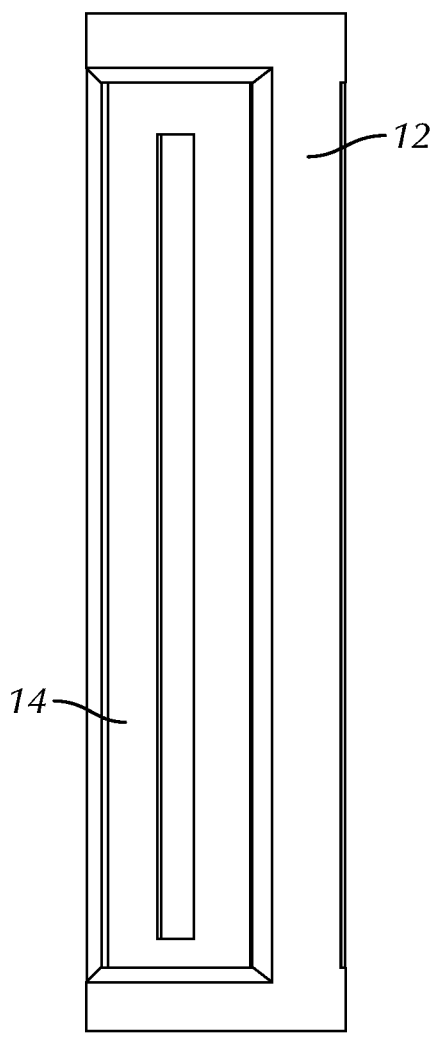
FIG. 11 is side view of the outer cylindrical tube of the embodiment of the apparatus of FIGS. 1 and 10.
Figure 24:
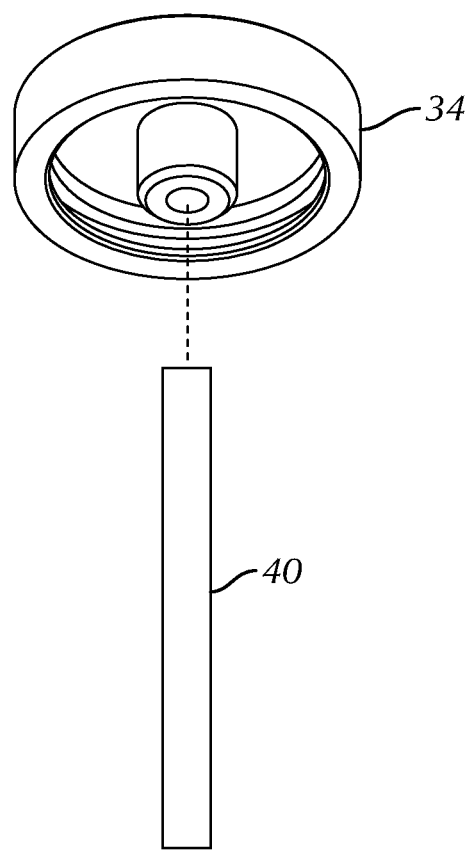
FIG. 24 is an exploded view of the top cap and stick of the top of the embodiment of the apparatus of the invention of FIG. 1.
Figure 26:
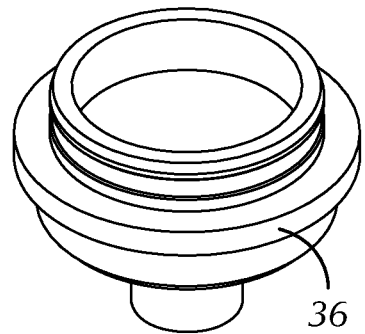
FIG. 26 is a top perspective view of the funnel.
Figure 27:
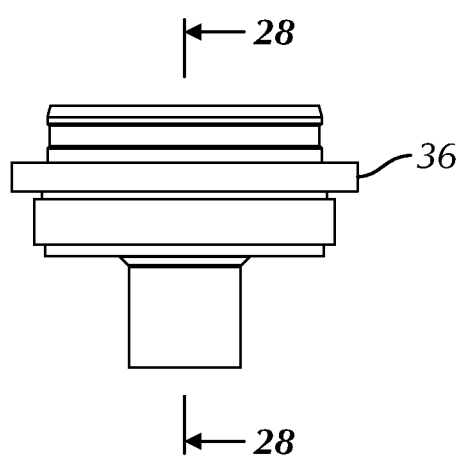
FIG. 27 is a side view of the funnel of FIG. 26.
Figure 28:
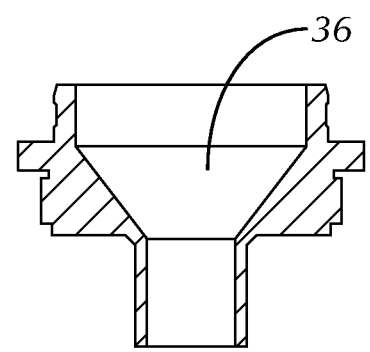
FIG. 28 is a side view of the funnel of FIGS. 26, and 27 with half removed to show the interior.
Figure 29:
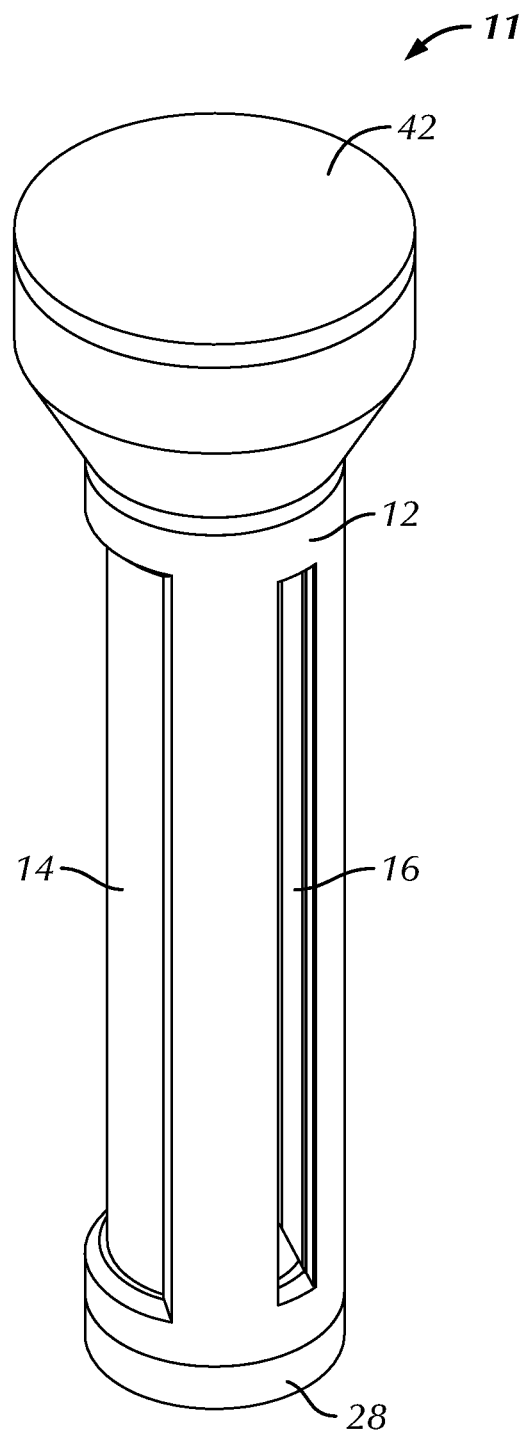
FIG. 29 is a top side perspective view of an alternative embodiment of the apparatus of the invention, like the apparatus of FIG. 1 except with the top cap removed and replaced with a grinder subassembly.
Figure 30:
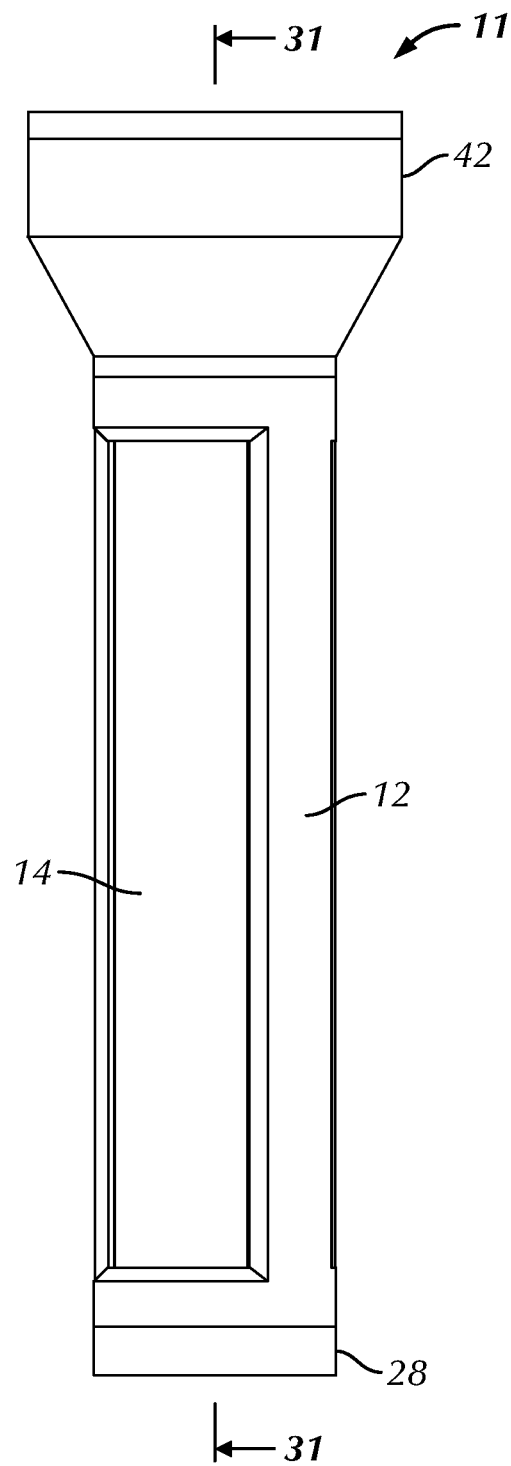
FIG. 30 is a side view of the alternative embodiment of the apparatus of the invention of FIG. 29.
Figure 31:
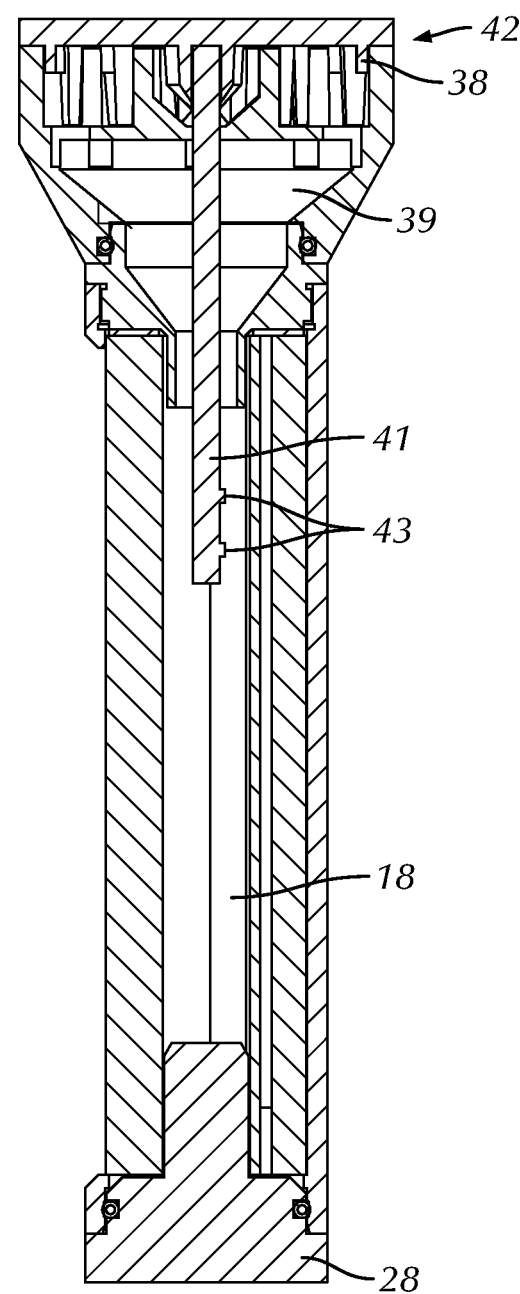
FIG. 31 is a side view of the alternative embodiment of the apparatus of the invention of FIGS. 29 and 30, with half cut away to show the interior.
Figure 35:
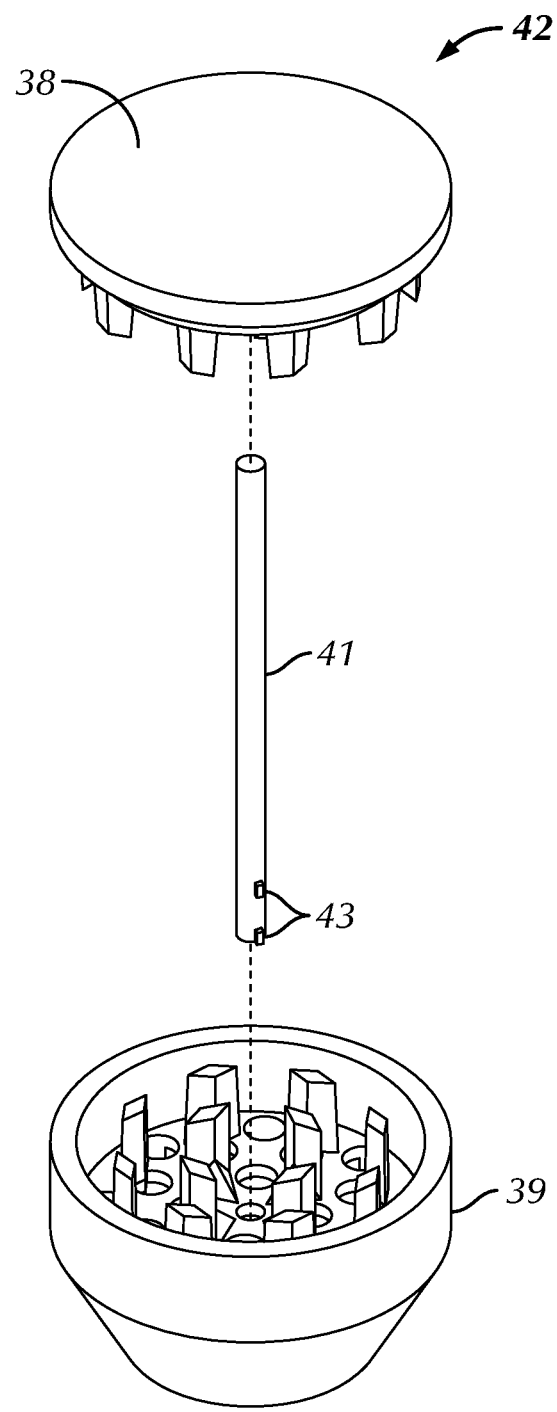
FIG. 35 is an exploded top side perspective view of the grinder assembly of FIG. 29, comprising two sections, a top section and a bottom section, with a stick underlying the top section.
Figure 36:
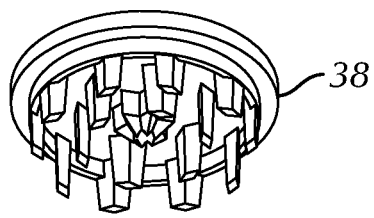
FIG. 36 is bottom perspective view (or underside view) of the top section of the grinder assembly of FIGS. 29 and 35.
Figure 38:
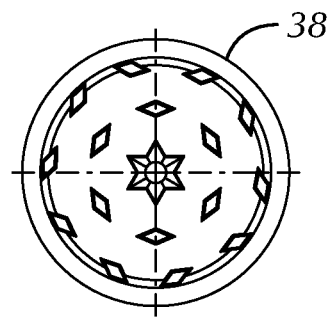
FIG. 38 is a bottom view of the top section of the grinder assembly of FIGS. 29 and 36.
Figure 37:
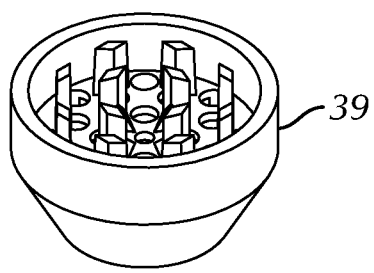
FIG. 37 is a top perspective view of the bottom section of the grinder assembly of FIGS. 29 and 35.
Figure 39:
FIG. 39 is a side view of the grinder assembly of FIG. 29.
Figure 40:
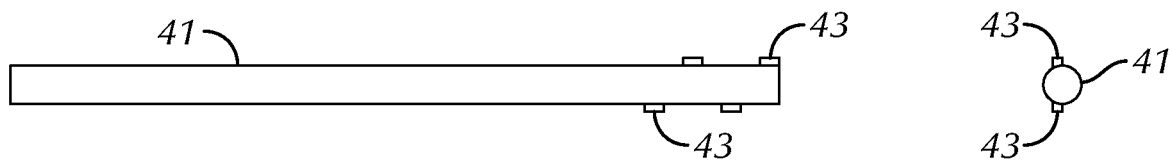
FIG. 40 is a side view of the stick of the grinder assembly of FIG. 35.
Figure 41:
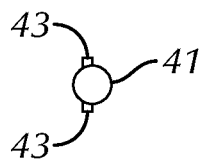
FIG. 41 is a top or bottom view of the stick of the grinder assembly of FIGS. 35 and 40.
Figure 49:
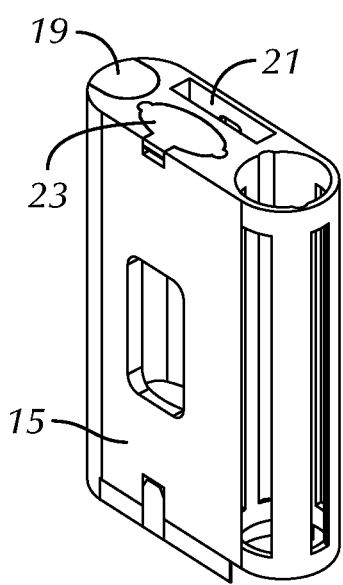
FIG. 49 is a front side perspective view of the apparatus with housing of FIG. 43 with the top cap and base removed from the apparatus of the invention.
Figure 51:
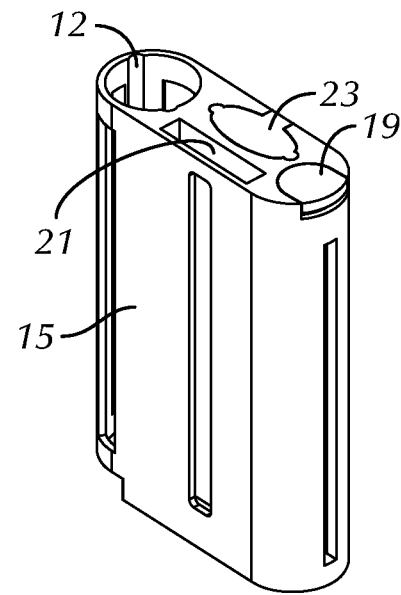
FIG. 51 is a back side perspective view of the apparatus with housing of FIG. 42 with the top cap and base removed from the apparatus of the invention.
Figure 50:
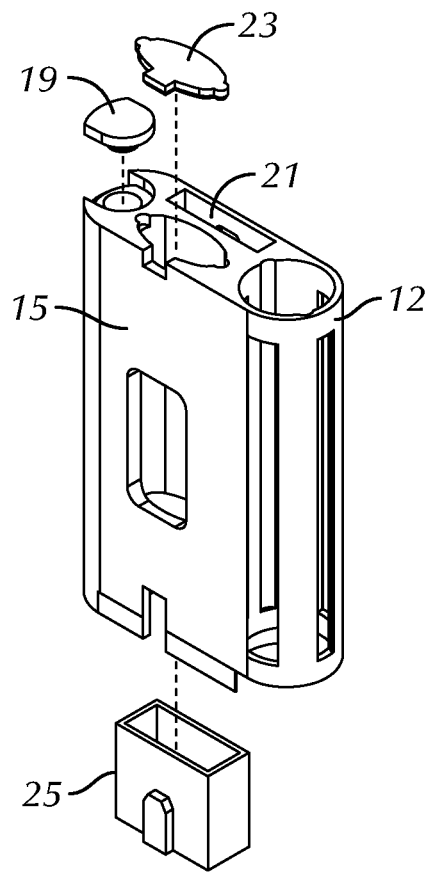
FIG. 50 is a partially exploded view of the apparatus with housing of FIG. 49.
Figure 52:
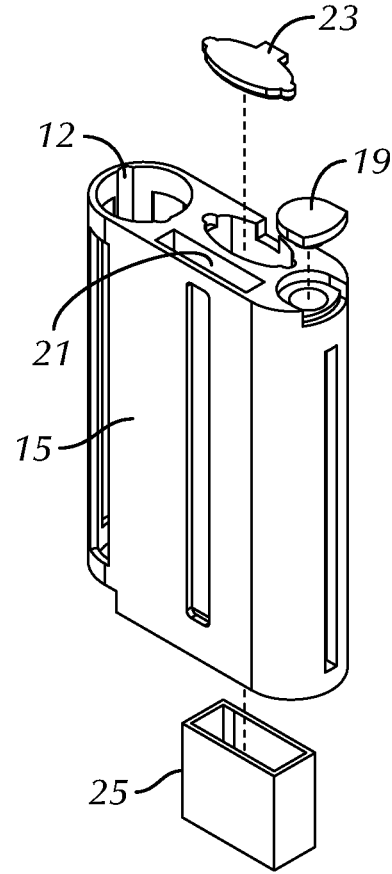
FIG. 52 is a partially exploded view of the apparatus of FIG. 51.
Figure 53:
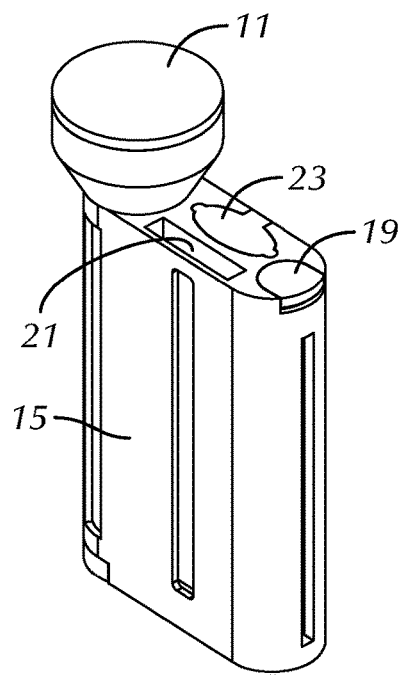
FIG. 53 is a back side perspective view of the still another alternative embodiment of the apparatus of the invention with housing having compartments for auxiliary materials or supplies of FIG. 42 with a grinder subassembly substituted for the top cap and optionally the funnel as well in the still another alternative embodiment of the apparatus of the invention.
Figure 54:
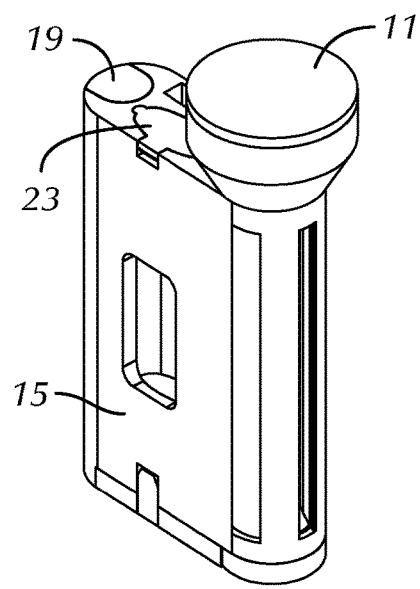
FIG. 54 is a front side perspective view of the apparatus with housing of FIG. 53.
Figure 55:
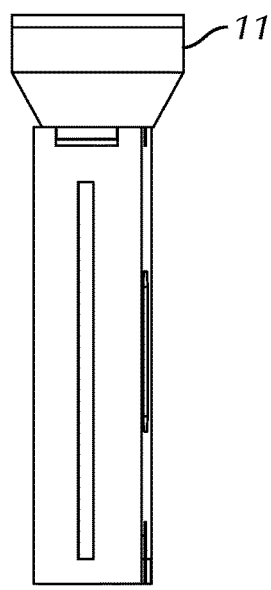
FIG. 55 is an end view of the apparatus with housing of FIGS. 53 and 54.
Figure 56:
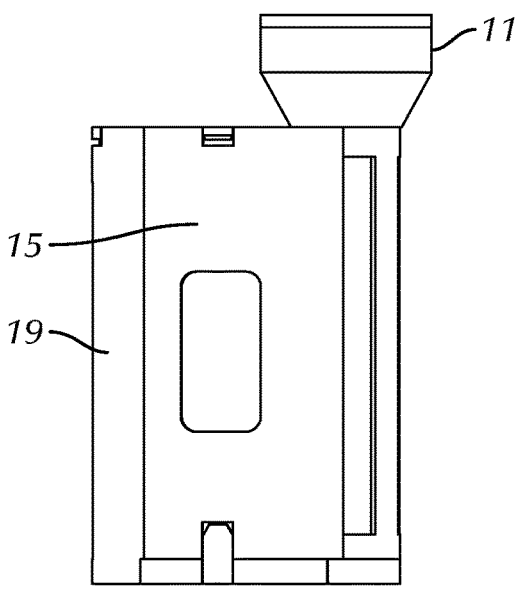
FIG. 56 is a side view of the apparatus with housing of FIGS. 53 and 54.
Figure 57:
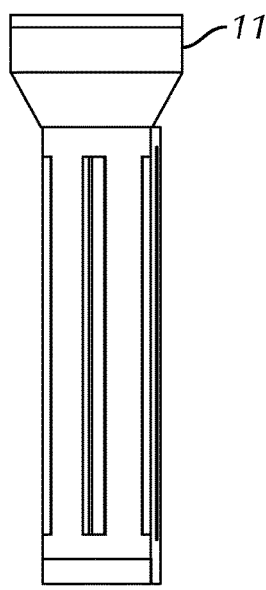
FIG. 57 is the opposing end view of the apparatus of FIGS. 53, 54, 55 and 56.

As shown in FIGS. 5, 6, and 24, top cap 34 has a protruding stick 40 extending from the middle of the underside of top cap 34 into the top or upper half portion of the hollow tube interior 22 of the inner cylindrical tube 18. Stick 40 serves to help press, compact or compress if needed, and help distribute the filler material 54 to be wrapped within the wrapping material or wrapping sheet 50. Stick 40 can be manually manipulated in the inner cylindrical tube 18 and even in funnel 36 for this purpose when the top cap 34 is removed, using the top cap 34 as a handle for the stick 40. Stick 40 can continue pressing the filler material 54 in the hollow tube interior 22 when top cap 34 is replaced on apparatus 10 after filler material 54 has been deposited into the hollow tube interior 22.

Some embodiments of the invention may not include stick 40, which is considered optional, as it may not be necessary for manipulating or pressing certain kinds of filler materials for wrapping, such as large pieces of material such as (food stuffs). However small pieces of filler materials such as typically used in making cigarettes for smoking by an individual often can benefit from a press and a stir by stick 40. Top cap 34 can snap, screw, or press-fit onto outer cylinder 12, or stay on by other similar means. However, top cap 34 should be removable or at least openable for revealing and using the funnel section 36 for putting material 54 into hollow tube interior 22. In some embodiments of the invention, top cap 34 may not have a funnel 36 beneath it. That is, in some embodiments of the invention, the apparatus of the invention will not include funnel 36.

In one embodiment of the apparatus of the invention, a grinder subassembly 42 can be positioned atop funnel section 36 instead of top cap 34, or instead of top cap 34 and funnel 36, as shown in FIGS. 29-41. Grinder subassembly 42 can be used to grind filler material 54 just before or as it is being placed or deposited into hollow tube interior 22 of inner cylindrical tube 18. Grinder subassembly 42 shown has a top section 38 and a bottom section 39. Top section 38 of the grinder subassembly 42 has an alternative stick 41 extending from the middle of the underside of that top section 38 down through the bottom section 39 of grinder subassembly 42 and on into at least the top portion of inner cylindrical tube 18, to facilitate transitioning the ground material into the inner cylindrical tube 18. Bottom section 39 can substitute for funnel 36 so that funnel 36 is not needed. Stick 41 has protrusions or lips 43 which facilitate moving the filler material 54 around. This embodiment of the apparatus of the invention, referenced as apparatus 11 in the Figures, is otherwise like apparatus 10.

In one embodiment of the apparatus of the invention, inner cylindrical tube 18 is comprised of transparent material, such as clear hard plastic or glass for example, and the outer cylindrical tube 12 is comprised of hard plastic or glass, which may or may not also be transparent, or metal. In such embodiment, window 14 in outer cylindrical tube 12 as shown in FIGS. 1, 2, 3, 5, 6, 7A, 8A, 9C, 10, and 11 is used to monitor the wrapping process within inner cylindrical tube 18.

When the wrapping is complete, the finished, wrapped cigarette, cigar, sushi roll, or other product is removed from the apparatus, either by removing base 28 or alternative base 30 and pulling the product out from the bottom or distal end of the apparatus, or by removing top cap 34 and funnel 36 and pulling the wrapped product out from the top or proximal end of the apparatus.

The wrap can be sealed in ways known in the art for sealing hand wrapped cigarettes, cigars and wrapped food. For example, for cigarettes and cigars, the wrapping material or wrapping sheet 50 is typically thin paper with a non-toxic adhesive end or side which can be moistened for activation and sealing of the wrap. Such sealing can be done through the longitudinal opening 16 by moistening before such end of the sheet 50 before it enters longitudinal opening 16 to being the wrapping, or the sealing can be done after the cigarette, cigar or wrapped food or other product is removed from apparatus.

In the process of using the apparatus of the invention, the side end of a wrapping material or wrapping sheet 50, which for a cigarette is a rolling paper, is inserted through longitudinal side opening 16 in the outer cylindrical tube 12 and corresponding or associated longitudinal side opening 20 in inner cylindrical tube 18 while beginning to turn base 28 or base 30 such that said inserted end of the wrapping material 50 reaches or is positioned inside the hollow tube interior 22 of inner cylinder 18 or is caught by lip 26. If desired, stick 40 or alternative stick 41 can be used to poke, press, compress, compact, move and/or re-distribute material 54, which has already been deposited within hollow tube interior 22. Turning of base 28 or alternative base 30 continues, usually one revolution, causing the wrapping material or wrapping sheet 50 to wrap the filler material 54 (to be wrapped) within it. The completeness of the wrap can be observed through window 14 when inner cylindrical tube 18 is at least partially transparent at the location of the window 14, and when the wrap is complete, that is for a cigarette, when the cigarette is fully formed, then the wrapping stops, and if sealing the wrap is desired, such seal is completed. For example, a paper for wrapping a cigarette may have a non-toxic or edible glue at or on the external longitudinal end of the wrapping paper, which can be activated for sealing, such as by moistening. When such moistened or glue-activated end of the paper reaches the filler material or adjacent paper, that glue-activated end will stick to it making a seal. The wrapped product is removed from apparatus 10 by lifting up or lifting off the top cap 34 if it is removable, or by removing or similarly lifting up or lifting off the base 28 (or alternative base 30).

In one embodiment, this process, and the apparatus of the invention is at least partially automated, rather than done by hand. That is, rather than the base 28 or alternative base 30 being turned by hand, it can be automatically turned. Similarly, rather than the wrapper 50 being inserted into the apparatus by hand, it can be automatically inserted. Rather than the filler material 54 being manually directed and deposited into the hollow tubular interior 22, it can be automatically directed and deposited there, from a depository, such as cup 60 for example. Rather than the wrapped product being manually removed from the apparatus of the invention, the wrapped product can be automatically ejected from the apparatus. Any one, or any combination, or all of these automations could be used in the apparatus of the invention, instead of the manual operation previously described. Power for the automation could be by battery or through an electrical outlet directly. And the housing would accommodate the automation equipment to effect the different automatic operations.

In another embodiment of the present invention, referring to FIGS. 42-57, alternative or auxiliary housing 15 for the apparatus of the invention comprises an apparatus substantially like apparatus 10 (FIGS. 42-48) or like apparatus 11 (FIGS. 42-57) described above except for the housing 15. That is, in this embodiment shown in FIGS. 42-57, the alternative or auxiliary housing 15 can be substituted for outer cylindrical tube for housing 12 or can be used in addition to the outer cylindrical tube comprising housing 12. Housing 15 comprises holders 21 or holding pockets 23, or chambers 19 or containers 25 for other auxiliary or supplemental items, in addition to holding an apparatus of the invention further configured in FIGS. 42-48 with a top cap like apparatus 10 in FIG. 1, or configured in FIGS. 53-57 with a grinder instead of a top cap, like apparatus 11 in FIG. 29.

For example, FIGS. 42-57 show housing 15 as an alternative or auxiliary housing holding apparatus 10 or 11, pocket sized and particularly suited for facilitating rolling of cigarettes of tobacco, herbs, or *cannabis*. Thus, housing 15 further comprises a storage chamber 19 for additional or extra filler material 54 to be rolled or wrapped, a holder 21 for additional or extra rolling paper or other wrapping material or wrapping sheets 50, a pocket 23 for receiving, retaining, or storing a lighter for lighting cigarettes for smoking, and a container 25 for filters 52. In still another embodiment (not shown), alternative or auxiliary housing 15 could further have a container for a special or alternative stick that would be longer and could reach further or extend more into the hollow interior tube 22 than stick 40, alternative housing 15 and/or could have an extra pocket to store already wrapped cigarettes or cigars.

Figure 58:
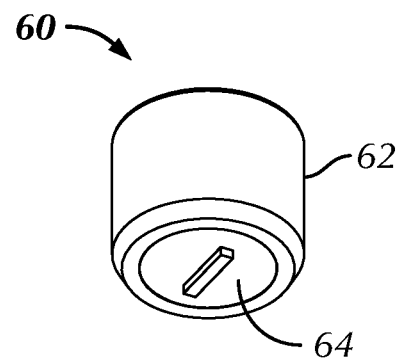
FIG. 58 is a bottom perspective view of a filler material storage cup accessory for the apparatus of the invention.
Figure 59:
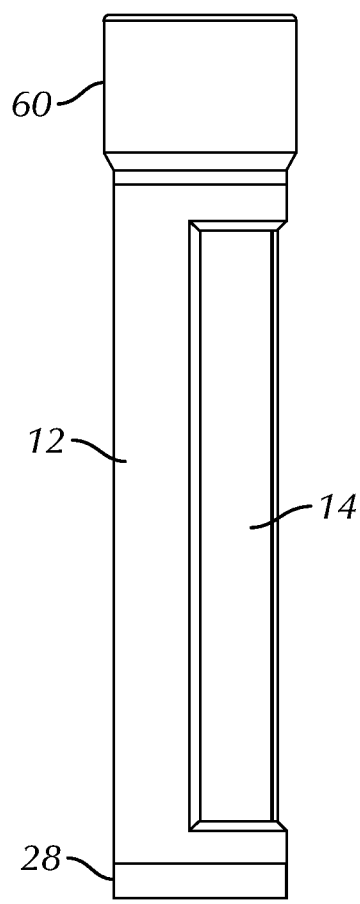
FIG. 59 is a side view of the apparatus of the invention of FIG. 1 with the storage cup of FIG. 58 fitted on top with the top cap removed.
Figure 60:
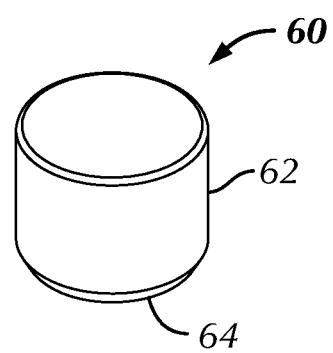
FIG. 60 is a top perspective view of the storage cup of FIG. 58.
Figure 61:
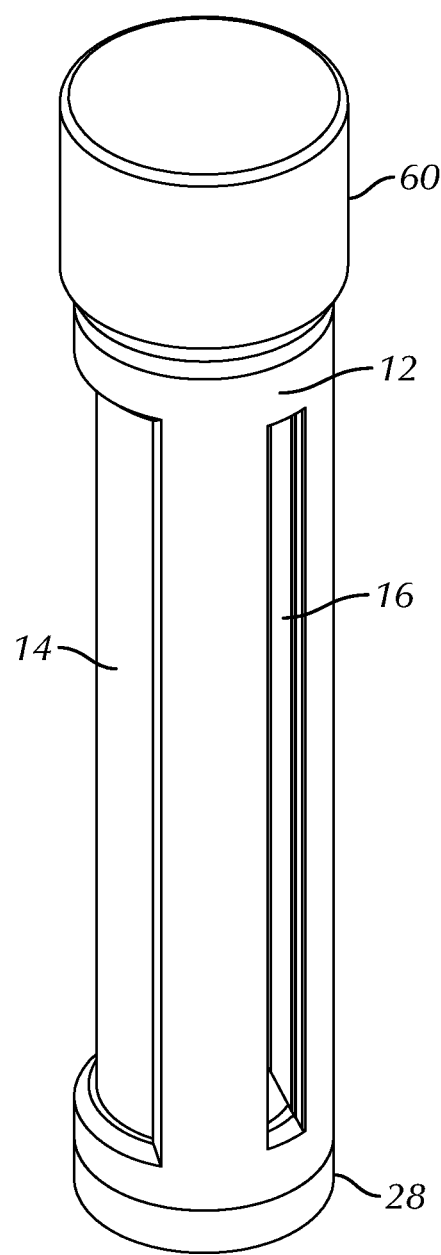
FIG. 61 is a top side perspective view of the apparatus shown in FIG. 59 with the storage cup of FIG. 58 fitted on top with the top cap removed.

Alternative or auxiliary housing 15 could be larger than pocket-sized and could have ability to attach other accessories and/or auxiliary or support items, such as for example storage containers for extra filler material 54. FIGS. 58-61 show an example of such a storage container or cup 60, which could be carried separate from apparatus 10 or apparatus 11 whether or not cup 60 would fit into a compartment of housing 15. Storage container or cup 60 has a body 62 for holding material such as filler material 54 and a lid 64 (shown in two parts when blown up in FIG. 60). As shown in FIGS. 58 and 59, the storage container or cup 60, with its lid 64 removed, can be positioned atop apparatus 10 (or apparatus 11) with the top cap 34 removed so that the contents of the cup 60 can flow into the apparatus 10 (or 11), and particularly into hollow tubular interior 22 of inner cylindrical tube 18.

Figure 62:
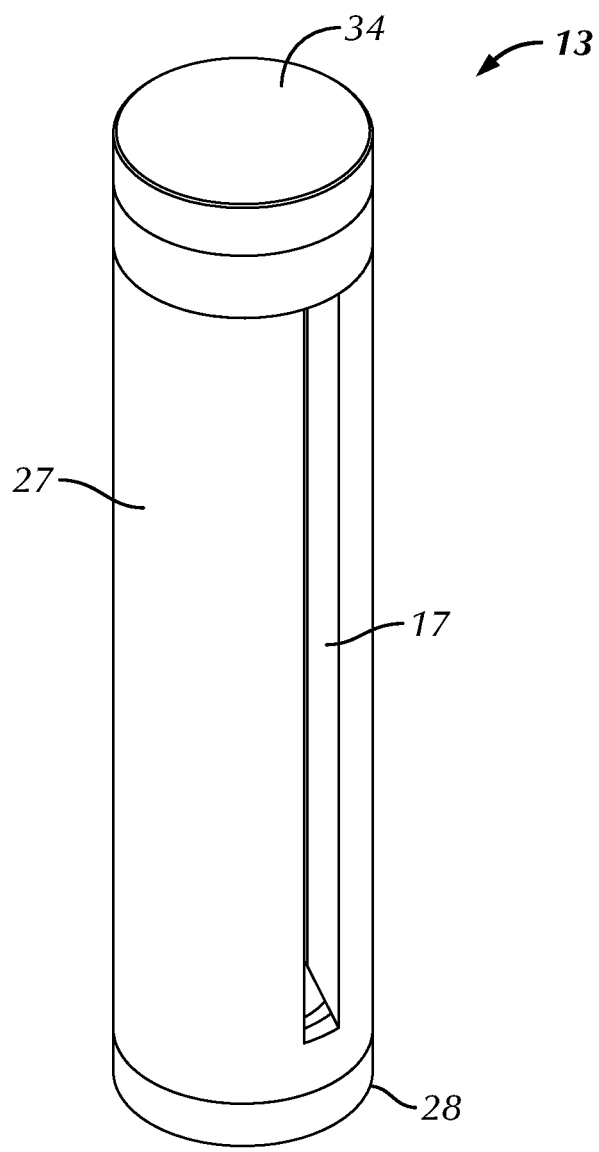
FIG. 62 is a top side perspective view of an still another alternative embodiment of the apparatus of the invention, like the apparatus of FIG. 1 except comprised of a single cylindrical tube instead of an inner cylindrical tube fitted inside an outer cylindrical tube.
Figure 63:
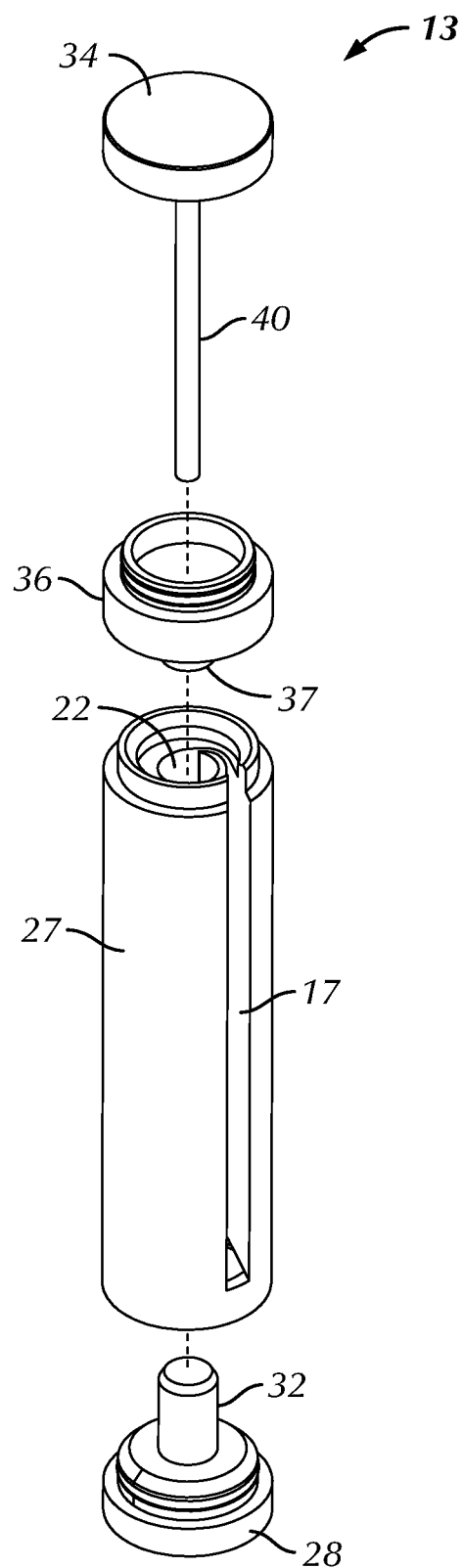
FIG. 63 is an exploded perspective view of the embodiment of the apparatus of the invention of FIG. 62.

Another alternative embodiment of the apparatus of the invention, apparatus 13, could also be used in the housing 15 as described above, instead of apparatus 10 or 11 described, and like apparatus 10 and 11, could be used without such housing 15 as well. Apparatus 13, shown in FIGS. 62 and 63, is substantially like apparatus 10, and could work like apparatus 11 with a grinder subassembly 42 as well. The primary difference in apparatus 13 and apparatus 10 is that apparatus 13 has only one cylindrical tube, instead of an inner cylindrical tube fitted inside an outer cylindrical tube. Functionally, however, the single cylindrical tube 27 of apparatus 13, with its longitudinal side opening 17, is like the inner cylindrical tube 18 fitted inside the outer cylindrical tube 14, with their respective corresponding longitudinal side openings 20 and 16, of apparatus 10.

Other embodiments of the apparatus of the invention with more than two cylindrical tubes fitted and/or coordinated together could also be alternatively used, provided their fitting and/or coordination resulted in their operation and function being substantially as described.

The Figures show embodiments of the apparatus of the invention prepared for manual use. However, these embodiments could easily be adapted for electronic operation, having for example a battery or electricity provide energy for operation of the apparatus as described above.

While preferred embodiments of the present disclosure have been described, it should be understood that other various changes, adaptations and modifications can be made therein without departing from the spirit of the invention(s) and the scope of the appended claims. The scope of the present disclosure should, therefore, be determined not with reference to the above description, but instead should be determined with reference to the appended claims along with their full scope of equivalents. Furthermore, it should be understood that the appended claims do not necessarily comprise the broadest scope of the invention(s) which the applicant is entitled to claim, or the only manner(s) in which the invention(s) may be claimed, or that all recited features are necessary.

What is claimed is:

1. An apparatus for rolling wrappable, smokable or edible material within a wrapper of rectangular sheet form with ease and efficiency, the apparatus comprising:
    an outer cylindrical tube with a longitudinal side opening;
    an inner cylindrical tube inside said outer cylindrical tube and having:
        (a) an opening at the proximal end for receiving said wrappable, smokable or edible material;
        (b) a hollow tubular interior for holding said wrappable, smokable or edible material; and
        (c) a longitudinal side opening corresponding to said longitudinal side opening of the outer cylindrical tube, extending from the exterior of said inner cylindrical tube into said hollow tubular interior to provide a side opening into said hollow tubular interior sufficiently sized for receiving the wrapper, such that said side opening into said hollow tubular interior is straight, curved, or arched approximating the beginning of a spiral up into said hollow interior, allowing or facilitating said wrapper to enter and be gripped in or held in the hollow tubular interior and rolled at least about once around the hollow tube interior to receive and wrap said wrappable, smokable or edible material and allow closure of the wrapper such that the wrapper and wrapped material within maintain a columnar shape;
    a top cap and/or grinder removably fitted into the proximal end of the outer cylindrical tube;
    an optional funnel beneath said top cap protruding into the upper portion of the hollow tubular interior of the inner cylindrical tube to help direct said wrappable, smokable or edible material into said hollow tubular interior of the inner cylindrical tube; and
    a rotatable bottom or base, optionally removable or openable, fitted into the distal end of the outer cylindrical tube and having an elongated central protrusion extending into the hollow tubular interior of the inner cylindrical tube optionally adapted for optionally receiving and holding a filter, and for grabbing or gripping the wrapper for rolling it for receiving said wrapper into said hollow tubular interior and for wrapping said wrapper around said wrappable, smokable or edible material.

2. The apparatus of claim 1 wherein said rotatable bottom or base is removable or openable for removal of the rolled wrappable, smokable or edible material within the wrapper upon completion of the wrap.

3. The apparatus of claim 1 wherein said rotatable bottom or base is adapted for receiving a filter and is removable or openable for placement of the filter on said elongated central protrusion and wherein said filter acts to grab or grip the wrapper for rolling it for receiving said wrapper into said hollow tubular interior and for wrapping said wrapper around said wrappable, smokable or edible material.

4. The apparatus of claim 1 further comprising a lip at the base of the hollow tubular interior of the inner cylindrical tube such that said lip helps hold said wrapper adjacent said filter for wrapping said filter with said wrappable, smokable or edible material within said wrapper.

5. The apparatus of claim 1 wherein said top cap has an elongated stick protrusion that fits into the hollow tubular interior of the inner cylindrical tube to poke and position the wrappable, smokable or edible material when said material is within the hollow tubular interior of the inner cylindrical tube.

6. The apparatus of claim 1 wherein the wrappable, smokable or edible material is tobacco, herbs or *cannabis* and the wrapper is a sheet of a non-toxic, cigarette-rolling paper for smoking, and wherein the apparatus is comprised within a housing, which further comprises:
    a hollow cylinder, container, pocket, or pouch for containing filters for the cigarettes;
    a hollow container, pocket, or slot for multiple sheets of cigarette-rolling papers;
    a hollow opening, container, pocket, or pouch for receiving a cigarette lighter; and
    one or more optional containers, pockets or other spaces for storing tobacco, herbs or *cannabis* for rolling, for storing cigarettes or cigars already rolled, or for storing sticks for stirring, pushing and compressing the tobacco, herbs or *cannabis* within the hollow interior tube of the inner cylindrical tube prior to and/or during the rolling.

7. The apparatus of claim 6 sized to fit in a pocket of a garment.

8. The apparatus of claim 1 wherein the inner cylindrical tube is at least partially transparent and the outer cylindrical tube comprises a window that allows viewing into the hollow tubular interior of the inner cylindrical tube for observation of the rolling of the wrappable, smokable or edible material within the wrapper.

9. The apparatus of claim 1 wherein the top cap and the base are fitted to the apparatus or the outer cylindrical tube of the apparatus by a snapping mechanism comprising compression during insert and decompression when connected.

10. The apparatus of claim 9 wherein the snapping mechanism comprises an inner soft and outer rigid O-ring layer.

11. The apparatus of claim 9 wherein the snapping mechanism comprises canted coil springs.

12. The apparatus of claim 1 that is at least partially automated.

13. The apparatus of claim 1 further comprising an attachable cup comprising wrappable, smokable or edible material that can be fitted at the proximal end of the apparatus instead of the top cap for distribution of said material into the hollow tubular interior of said apparatus.

14. An apparatus for rolling wrappable, smokable or edible material within a wrapper with ease and efficiency, the apparatus comprising:
   a cylindrical tube having:
   (a) an opening at the proximal end for receiving said wrappable, smokable or edible material;
   (b) a hollow tubular interior for holding said wrappable, smokable or edible material for wrapping; and
   (c) a longitudinal side opening extending from the exterior of said tube into the hollow tubular interior to provide a side opening into said hollow tubular interior sufficiently sized for receiving the wrapper, such that said side opening into said hollow tubular interior is straight, curved, or arched approximating the beginning of a spiral up into said hollow tubular interior, allowing or facilitating said wrapper to enter and be gripped in or held in the hollow tubular interior and allowing or facilitating said wrapper to be rolled at least about once around the hollow tube interior to wrap said wrappable, smokable or edible material and allow closure of the wrapper;
   a top cap removably fitted into the proximal end of the tube;
   a funnel beneath said top cap protruding into the hollow tubular interior of the tube to help direct said wrappable, smokable or edible material into said hollow tubular interior of the tube and to help support the wrapper; and
   a rotatable bottom or base, optionally removable or openable, fitted into the distal end of the tube and having an elongated central protrusion extending into the hollow tubular interior of the tube for optionally receiving and holding a filter, and for grabbing or gripping the wrapper, for rolling it, and for receiving said wrapper into said hollow tubular interior, and for wrapping said wrapper around said wrappable, smokable or edible material.

15. The apparatus of claim 14 wherein the wrappable, smokable material is tobacco, herbs or *cannabis* and the wrapper is a sheet of a non-toxic, cigarette-rolling paper for smoking, and wherein the apparatus further comprises:
   a housing, which comprises:
      a hollow cylinder or other space for containing filters for the cigarettes;
      a hollow container or other space for multiple sheets of cigarette-rolling papers;
      a hollow opening or other space for receiving a cigarette lighter; and
      one or more optional pockets or spaces for storing tobacco, herbs or *cannabis* for rolling, for storing cigarettes or cigars already rolled, or for storing sticks for stirring, pushing and compressing the tobacco, herbs or *cannabis* within the hollow interior tube of the tube prior to and/or during the rolling.

16. The apparatus of claim 15 wherein the tube is comprised of transparent plastic at least where it allows observation of the wrapping of the smokable material within the tubular interior.

17. An apparatus for rolling wrappable, smokable or edible material within a wrapper with ease and efficiency, the apparatus comprising:
   a cylindrical tube having:
   (a) an opening at the proximal end for receiving said wrappable, smokable or edible material;
   (b) a hollow tubular interior for holding said wrappable, smokable or edible material for wrapping; and
   (c) a longitudinal side opening extending from the exterior of said tube into the hollow tubular interior to provide a side opening into said hollow tubular interior sufficiently sized for receiving the wrapper, such that said side opening into said hollow tubular interior is straight, curved, or arched approximating the beginning of a spiral up into said hollow tubular interior, allowing or facilitating said wrapper to enter and be gripped in or held in the hollow tubular interior and allowing or facilitating said wrapper to be rolled at least about once around the hollow tube interior to wrap said wrappable, smokable or edible material and allow closure of the wrapper;
   a grinder removably fitted into the proximal end of the tube;
   a funnel beneath said grinder protruding into the hollow tubular interior of the tube to help direct said wrappable, smokable or edible material into said hollow tubular interior of the tube; and
   a rotatable bottom or base, optionally removable or openable, fitted into the distal end of the tube and having an elongated central protrusion extending into the hollow tubular interior of the tube for optionally receiving and holding a filter, and for grabbing or gripping the wrapper for rolling it and for receiving said wrapper into said hollow tubular interior and for wrapping said wrapper around said wrappable, smokable or edible material.

18. The apparatus of claim 17 wherein the wrappable, smokable material is tobacco, herbs or *cannabis* and the wrapper is a sheet of a non-toxic, cigarette-rolling paper for smoking, and wherein the apparatus further comprises:
   a housing, which comprises:
      a hollow cylinder or other space for containing filters for the cigarettes;
      a hollow container or other space for multiple sheets of cigarette-rolling papers;
      a hollow opening or other space for receiving a cigarette lighter; and
      one or more optional pockets or spaces for storing tobacco, herbs or *cannabis* for rolling, for storing cigarettes or cigars already rolled, or for storing sticks for stirring, pushing and compressing the tobacco, herbs or *cannabis* within the hollow interior tube of the tube prior to and/or during the rolling.

19. An apparatus for rolling wrappable, smokable or edible material within a wrapper, the apparatus comprising at least one cylindrical tube having:
   (a) an opening for receiving said wrappable, smokable or edible material;
   (b) a hollow tubular interior for holding said wrappable, smokable or edible material for rolling or wrapping; and
   (c) a side opening extending from the exterior of said tube into the hollow tubular interior for receiving the wrapper for rolling or wrapping said wrappable, smokable or edible material;
   (d) a rotatable bottom or base having a central protrusion extending into the hollow tubular interior of the tube for grabbing or gripping the wrapper for or during rolling or wrapping; and
   (e) a lip protruding into said hollow tubular interior to support the wrapper for or during rolling or wrapping.

\* \* \* \* \*